US012684311B2

(12) United States Patent　　(10) Patent No.:　US 12,684,311 B2

Edge et al.　　　　　　　　　　　　(45) Date of Patent:　　　Jul. 14, 2026

(54) CROWD SENSING USING RADIO FREQUENCY SENSING FROM MULTIPLE WIRELESS NODES

(71) Applicant: QUALCOMM Incorporated, San Diego, CA (US)

(72) Inventors: Stephen William Edge, Escondido, CA (US); Bapineedu Chowdary Gummadi, Hyderabad (IN); Bala Ramasamy, San Marcos, CA (US); Xiaoxin Zhang, Sunnyvale, CA (US); Ravi Shankar Kadambala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 536 days.

(21) Appl. No.: 17/848,528

(22) Filed: Jun. 24, 2022

(65) Prior Publication Data

US 2023/0421993 A1　　Dec. 28, 2023

(51) Int. Cl.
H04W 4/029　　　　(2018.01)

(52) U.S. Cl.
CPC ................................. H04W 4/029 (2018.02)

(58) Field of Classification Search
CPC ....... H04W 4/029; H04W 64/00; G01S 13/08; H04L 5/0005; H04L 5/0007; H04L 5/0016; H04L 5/0023; H04L 5/0035; H04L 5/0053; H04L 5/0091
See application file for complete search history.

(56) References Cited

U.S. PATENT DOCUMENTS

| | | | | |
|---|---|---|---|---|
| 10,992,755 B1 * | 4/2021 | Tran | ...................... | B60W 40/09 |
| 11,269,352 B2 * | 3/2022 | Tao | ................... | G01C 21/3492 |
| 11,537,868 B2 * | 12/2022 | Arditi | .................. | G06N 3/0475 |

(Continued)

FOREIGN PATENT DOCUMENTS

WO　　　2022081624 A1　　4/2022

OTHER PUBLICATIONS

International Search Report and Written Opinion—PCT/US2023/019889—ISA/EPO—Jul. 14, 2023.

*Primary Examiner* — Jinsong Hu
*Assistant Examiner* — Rui M Hu
(74) *Attorney, Agent, or Firm* — Thien T. Nguyen

(57)　　　　　　ABSTRACT

Techniques are provided for obtaining environmental information using radio frequency sensing by one or more wireless devices. An example method of crowd sensing and/or environmental detection using radio frequency sensing with one or more wireless devices includes providing radio frequency sensing assistance data to one or more wireless devices, receiving radio frequency sensing reports from the one or more wireless devices, determining one or more environmental characteristics based on the radio frequency sensing reports. Environmental characteristics can include a location or movement of one or more target objects, or attributes of one or more target objects (e.g., one or many people, vehicles, animals, drones or other target objects), or any combinations thereof. This may assist with monitoring of a crowd or road traffic and/or with identifying and tracking a particular person or vehicle.

30 Claims, 22 Drawing Sheets

(56)         References Cited

U.S. PATENT DOCUMENTS

| | | | |
|---|---|---|---|
| 2009/0222388 A1* | 9/2009 | Hua | G06N 3/09 |
| | | | 382/103 |
| 2011/0143779 A1* | 6/2011 | Rowe | H04M 3/42348 |
| | | | 455/456.3 |
| 2013/0009569 A1* | 1/2013 | Knibbe | H05B 47/19 |
| | | | 315/297 |
| 2013/0054698 A1* | 2/2013 | Lee | H04W 4/023 |
| | | | 709/204 |
| 2014/0067768 A1* | 3/2014 | Fateh | G06F 16/22 |
| | | | 707/684 |
| 2016/0189544 A1* | 6/2016 | Ricci | G08G 1/096725 |
| | | | 701/117 |
| 2016/0231746 A1* | 8/2016 | Hazelton | G05D 1/0274 |
| 2017/0124476 A1* | 5/2017 | Levinson | B60L 3/0007 |
| 2017/0261594 A1* | 9/2017 | Wu | G01S 7/003 |
| 2017/0270827 A1* | 9/2017 | Channabasappa | A43B 3/34 |
| 2019/0199457 A1* | 6/2019 | Chopra | H04B 7/088 |
| 2019/0230320 A1* | 7/2019 | Moriya | H04N 7/18 |
| 2019/0258737 A1* | 8/2019 | Wang | G01C 21/3848 |
| 2020/0081092 A1* | 3/2020 | Choi | G01S 13/89 |
| 2020/0198141 A1* | 6/2020 | Govindaraj | G01C 21/383 |
| 2020/0209864 A1* | 7/2020 | Chen | G01C 21/3811 |
| 2021/0110706 A1* | 4/2021 | Graefe | G01C 21/206 |
| 2022/0022056 A1 | 1/2022 | Park et al. | |
| 2022/0092987 A1* | 3/2022 | Oboril | G08G 1/166 |
| 2023/0135955 A1* | 5/2023 | Endo | B25J 13/08 |
| | | | 701/25 |
| 2023/0309144 A1* | 9/2023 | Zhu | H04W 56/0015 |
| 2023/0328573 A1* | 10/2023 | Yang | H04W 24/02 |
| | | | 370/329 |
| 2023/0351070 A1* | 11/2023 | Hartley | G06F 30/20 |
| 2023/0354058 A1* | 11/2023 | Gummadi | H04W 24/10 |
| 2024/0005667 A1* | 1/2024 | Golov | G06F 16/29 |
| 2024/0112575 A1* | 4/2024 | Komori | G08G 1/04 |
| 2024/0337723 A1* | 10/2024 | Li | G01S 13/422 |
| 2024/0345210 A1* | 10/2024 | Li | G01S 7/006 |
| 2024/0353523 A1* | 10/2024 | Li | H04W 4/02 |

* cited by examiner

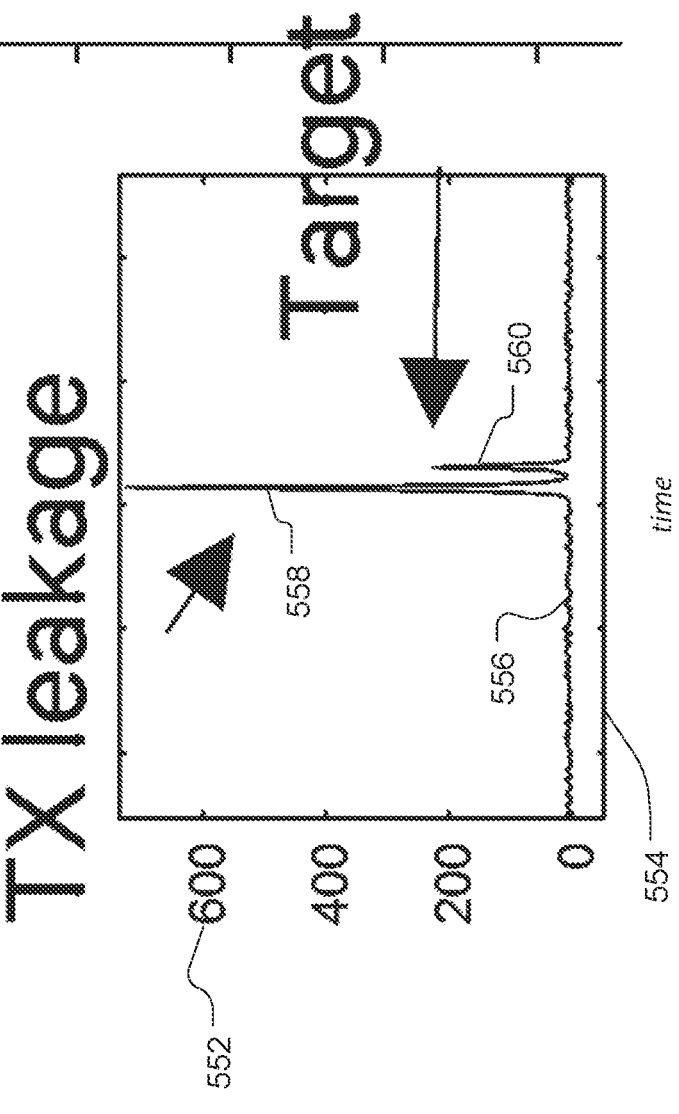
*FIG. 5B*

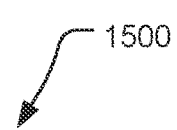

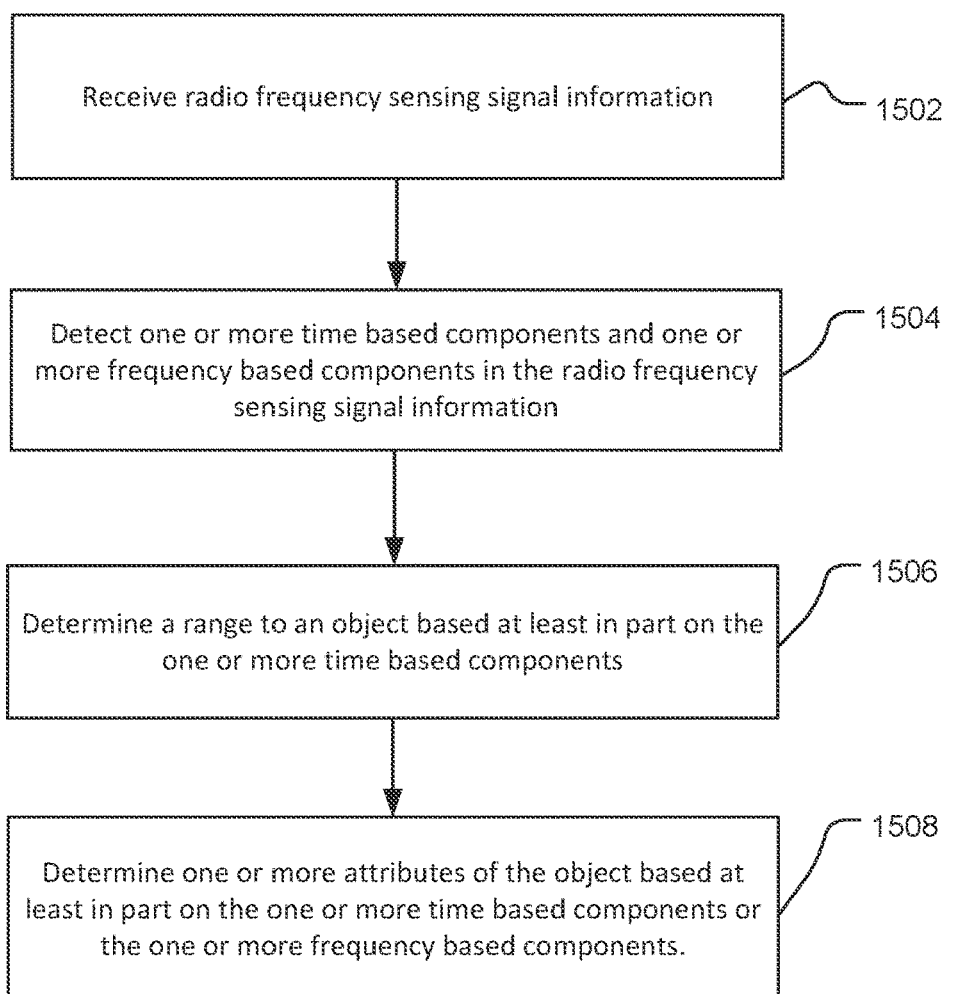

1500

Receive radio frequency sensing signal information     1502

Detect one or more time based components and one or more frequency based components in the radio frequency sensing signal information     1504

Determine a range to an object based at least in part on the one or more time based components     1506

Determine one or more attributes of the object based at least in part on the one or more time based components or the one or more frequency based components.     1508

*FIG. 15*

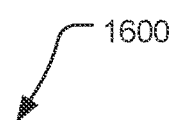
1600
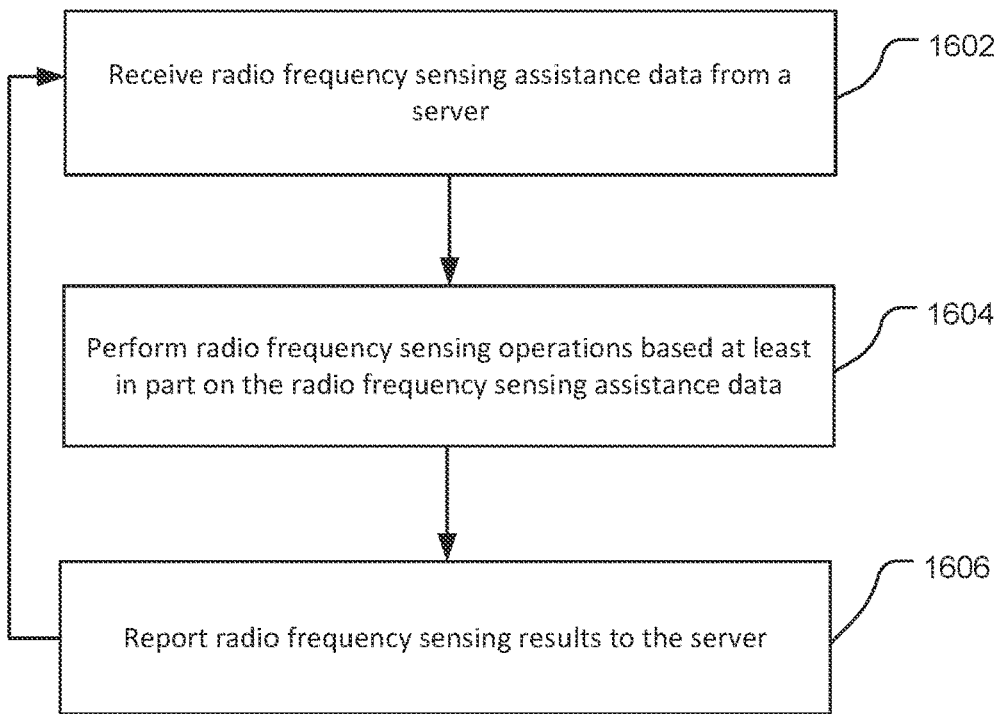
1602
Receive radio frequency sensing assistance data from a server
1604
Perform radio frequency sensing operations based at least in part on the radio frequency sensing assistance data
1606
Report radio frequency sensing results to the server
*FIG. 16*

1700

1702
Provide radio frequency sensing assistance data to one or more wireless devices 1704
Receive one or more radio frequency sensing reports from the one or more wireless devices 1706
Determine one or more environmental characteristics based at least in part on the one or more radio frequency sensing reports

CROWD SENSING USING RADIO FREQUENCY SENSING FROM MULTIPLE WIRELESS NODES

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data. Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile communication (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments.

Various mobile RF standards like 4G, 5G and WiFi (also referred to as Wi-Fi) may not only be used for communication but may also be used to determine characteristics of a local environment or nearby objects via RF sensing. Such non-communication uses may increase the benefits provided by mobile wireless devices and enhancements to these uses may thus be needed.

SUMMARY

An example method at a wireless device for crowdsourcing radio frequency sensing data according to the disclosure includes receiving radio frequency sensing assistance data from a server, performing radio frequency sensing operations based at least in part on the radio frequency sensing assistance data, and reporting radio frequency sensing results to the server.

Implementations of such a method may include one or more of the following features. The radio frequency sensing results may be used for determining one or more environmental characteristics. The radio frequency sensing results may be aggregated with a plurality of radio frequency sensing results received from a plurality of wireless devices, and the one or more environmental characteristics may be determined based on an aggregation of the radio frequency sensing results. The one or more environmental characteristics may comprise a movement of a target object, a location of the target object, one or more attributes of the target object, or any combination thereof. The one or more attributes of the target object may include a horizontal location, an altitude, a speed, a bearing, a size, a height, a width, a length, a weight, a type, a make, a model, a species, an orientation, a pose, a gait, a type of clothing, a carrying of a bag or package, a location area, a density, a number, a rate of numeric increase, a rate of numeric decrease, an average speed, a statistical direction of motion, or any combinations thereof. The radio frequency sensing assistance data may include information related to at least one of a movement, a location of a target object, or any combinations thereof. The radio frequency sensing assistance data may include information related to one or more attributes of a target object. The radio frequency sensing assistance data may include geographic information, and performing the radio frequency sensing operations may be based at least in part on the geographic information. The radio frequency sensing assistance data may include radio frequency (RF) signature or attribute information associated with one or more potential target objects, and performing the radio frequency sensing operations is based at least in part on the RF signature or attribute information. The radio frequency sensing assistance data may be received via one or more Radio Resource Control (RRC) messages or one or more IP messages or TCP/IP messages.

An example method of environment detection at a server using radio frequency sensing according to the disclosure includes providing radio frequency sensing assistance data to one or more wireless devices, receiving one or more radio frequency sensing reports from the one or more wireless devices, and determining one or more environmental characteristics based at least in part on the one or more radio frequency sensing reports.

Implementations of such a method may include one or more of the following features. Determining the one or more environmental characteristics may include aggregating the one or more radio frequency sensing reports. The one or more environmental characteristics may comprise a movement of a target object, a location of the target object, one or more attributes of the target object, or any combinations thereof. The one or more attributes of the target object may include a horizontal location, an altitude, a speed, a bearing, a size, a height, a width, a length, a weight, a type, a make, a model, a species, an orientation, a pose, a gait, a type of clothing, a carrying of a bag or package, a location area, a density, a number, a rate of numeric increase, a rate of numeric decrease, an average speed, a statistical direction of motion, or any combinations thereof. The radio frequency sensing assistance data may include information related to at least one of a movement, a location, one or more attributes of a target object, or any combinations thereof. The radio frequency sensing assistance data may include geographic information. The radio frequency sensing assistance data may include RF signature information, attribute information or both associated with a potential target object. The one or more radio frequency sensing reports may include sensor data obtained by the one or more wireless devices. The radio frequency sensing assistance data may be provided via one or more Radio Resource Control (RRC) messages or one or more IP or TCP/IP messages.

An example apparatus according to the disclosure includes a memory, at least one transceiver, at least one processor communicatively coupled to the memory and the at least one transceiver, and configured to receive radio frequency sensing assistance data from a server, perform radio frequency sensing operations based at least in part on the radio frequency sensing assistance data, and report radio frequency sensing results to the server.

An example apparatus according to the disclosure includes a memory, at least one transceiver, at least one processor communicatively coupled to the memory and the at least one transceiver, and configured to provide radio frequency sensing assistance data to one or more wireless devices, receive one or more radio frequency sensing reports from the one or more wireless devices, and determine one or more environmental characteristics based at least in part on the one or more radio frequency sensing reports.

Items and/or techniques described herein may provide one or more of the following capabilities, as well as other capabilities not mentioned. Multiple wireless nodes may receive radio frequency sensing assistance data from a network resource. The radio frequency assistance data may enable the multiple wireless nodes to jointly perform radio frequency sensing operations. The wireless nodes may provide radio frequency sensing results to a crowdsourcing server. The crowdsourcing server may be configured to build a composite map based on the radio frequency sensing results. Characteristics (e.g., inferences) regarding crowds, traffic flows, or other object attributes may be drawn based on the composite map. Crowd sensing may be realized without the need for dedicated sensors. Other capabilities may be provided and not every implementation according to the disclosure must provide any, let alone all, of the capabilities discussed.

BRIEF DESCRIPTION OF THE DRAWINGS

FIG. 5B is a graph of an example receive signal in the wireless device of FIG. 5A.

FIG. 15 is an example process flow of a method of determining object attributes with radio frequency sensing.

FIG. 16 is an example process flow of a method of crowdsourcing radio frequency sensing data.

Figure 1:
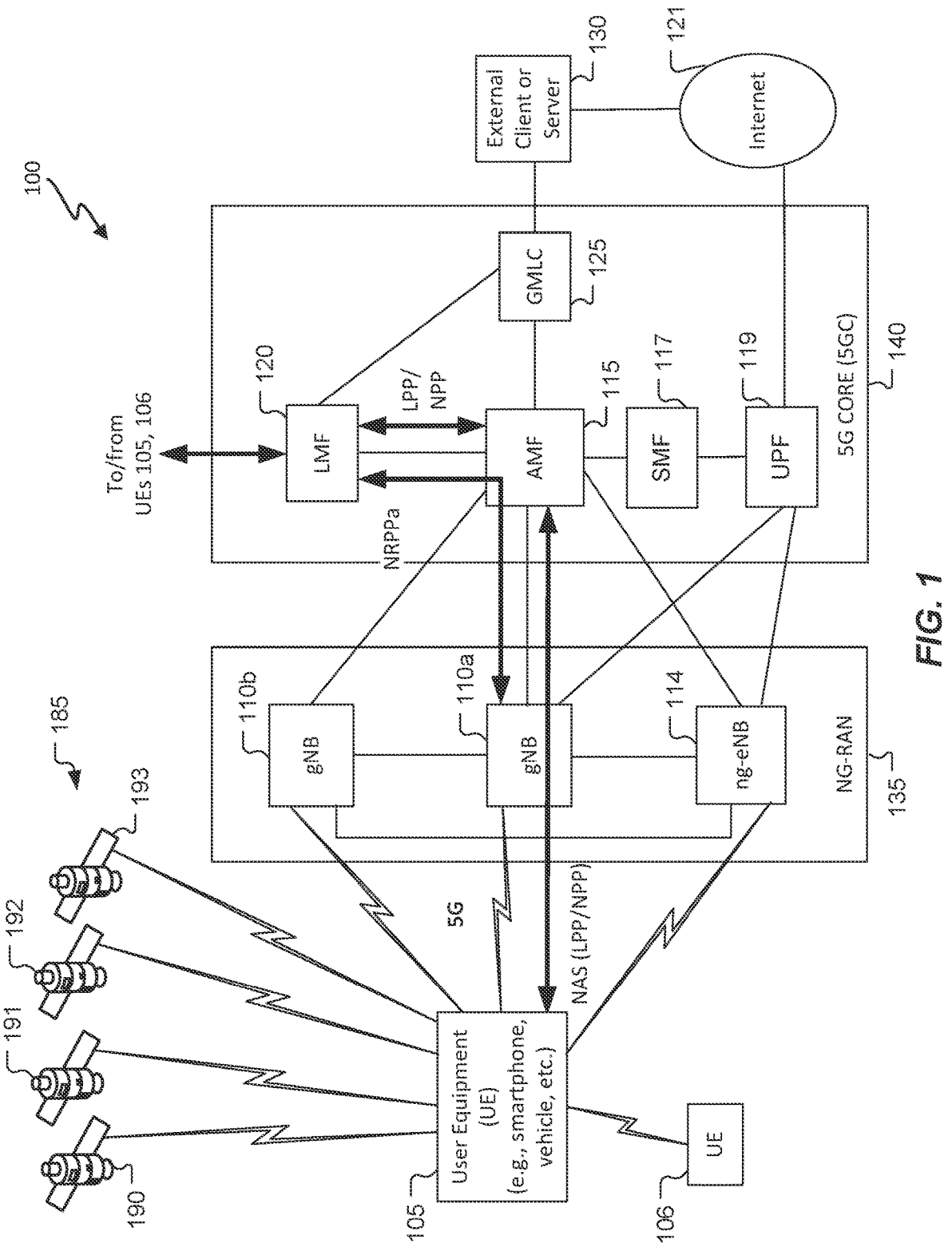
FIG. 1 is a simplified diagram of an example wireless communications system.

Like reference symbols in the various drawings indicate like elements, in accordance with certain example implementations. In addition, in some cases, multiple instances of an element may be indicated by following a first number for the element with a letter. For example, multiple instances of an element 110 may be indicated as 110*a*, 110*b*, etc. When referring to such an element using only the number, any instance of the element is to be understood (e.g. element 110 in the previous example would refer to elements 110*a* and 110*b*).

DETAILED DESCRIPTION

Techniques are discussed herein for obtaining information related to an environment or to one or more objects in an environment by means of RF sensing performed by multiple wireless enabled devices. The RF sensing performed by the multiple wireless enabled devices is referred to herein as crowd sensing and can differ from traditional "crowd sourcing" in that information can be provided related to a crowd of people or collection of objects that does not require any active support from the collection of objects or the crowd itself or from any devices associated with the crowd or the collection of objects.

One example of crowd sensing would be to obtain information about a crowd of people, such as the crowd size, crowd movement, rate of crowd increase or decrease. Other examples of crowd sensing would be obtaining information concerning traffic flow on a road or at the scene of an accident, or identifying and possibly tracking an individual person in a crowd or an individual vehicle on a road. For example, law enforcement, municipal planners, event organizers, retailers, sports stadium managers, etc. may utilize crowd information for emergency management, assisting and regulating pedestrian flow or traffic flow, business processes, and improving customer interfaces. Current crowd monitoring solutions may utilize expensive imaging technologies, artificial intelligence (AI), human observers, and additional sensors which may be prohibitively expensive. The techniques provided herein utilize existing wireless nodes and devices to obtain crowd and environmental information, and thus may be implemented at a fraction of the cost of the prior solutions.

In an example, multiple wireless nodes (e.g. UEs) may perform radio frequency (RF) sensing operations and provide sensor data to a server. The RF sensing data may be obtained during a single time period at a single location, over a period of time and/or at different locations. The sensor data may include RF sensor measurements which are obtained by transmitting RF signals (e.g., WiFi or 5G NR) and measuring reflected and/or scattered signals from surrounding objects. In an example, the sensor data may also include image data (e.g. images) from cameras and infrared (IR) cameras which can be combined with the RF measurements. The additional sensors may enable detection of people, animals and/or vehicles in many conditions including at night, in rain and when there are intervening objects (e.g. walls, buildings, trees, people).

In operation, an individual user equipment (UE) may be configured to report (e.g. periodically or when requested) sensor measurements obtained in the neighborhood of the UE. The report may include raw signal measurement data or characteristics/inferences from the signal measurements (e.g. a map of people or vehicles detected nearby to the UE or a 3D map of an area around the UE). The report may also include applicable timestamps and location information such as the current location of the UE or UE location related measurements. Other UEs (e.g. nearby to the UE) may be configured to obtain and report their sensor measurements. A crowdsourcing server may be configured to receive the RF sensing reports from the UEs and build a composite picture or map based on the reports (and the locations of the UEs and times of the reports). The crowdsourcing server, or another network server, may be configured to compute environmental characteristics based on the aggregated RF sensor reports. For example, characteristics may be obtained regarding crowd size, crowd movement, traffic flow or a building (e.g. to construct a building plan for a building on fire). The RF sensor signals may enable detection of attributes of an object, and the aggregated RF sensor reports may enable a network to track the object based on the attributes. For example, it may be possible to determine individual characteristics of a person or vehicle in UE reports (e.g., height, weight, clothing for a person, length, width, height for a vehicle) and then used the aggregated RF sensor reports to track the individual person or vehicle over a period of time based on the attributes. In contrast to prior tracking solutions, the RF sensing techniques described herein may enable monitoring of target objects without the need for the target objects to transmit signals, or be aware of the monitoring. The crowd sensing does not depend on each individual in a crowd to have a UE to report their location. These techniques and configurations are examples, and other techniques and configurations may be used.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT,"

a "client device," a "wireless device," a "subscriber device," a "subscriber terminal," a "subscriber station." a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a New Radio (NR) Node B (also referred to as a gNodeB or gNB). In addition, in some systems, a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

A used herein, the term "wireless node" includes devices configured to communicate on a wireless network. UEs and base stations are examples of wireless nodes. In particular, a wireless node includes at least a radio frequency transmitter and receiver (or transceiver), and may be configured to perform radio frequency sensing operations as described herein.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the communication system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a User Plane Function (UPF) 119, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client or server 130.

The UPF 119 may support voice and data bearers for UE 105 and may enable UE 105 voice and data access to other networks such as the Internet 121. The UPF 119 may be connected to gNBs 110 and ng-eNB 114. UPF 119 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering.

As illustrated, the SMF 117 connects to the AMF 115 and the UPF 119. The SMF 117 may have the capability to control both a local and a central UPF within a PDU session. SMF 117 may manage the establishment, modification and release of PDU sessions for UE 105, perform IP address allocation and management for UE 105, act as a Dynamic Host Configuration Protocol (DHCP) server for UE 105, and select and control a UPF 119 on behalf of UE 105.

The external client or server 130 may be connected to the 5GC 140 via the GMLC 125. The external client or server 130 may also be connected to the 5GC 140 via the Internet 121. The external client or server 130 may be connected to the UPF 119 directly (not shown in FIG. 1) or through the Internet 121. The external client or server 130 may be a server, a web server, or a user device, such as a personal computer, a UE, etc.

Base stations such as the gNBs 110a, 110b and/or the ng-eNB 114 may each support a macro cell (e.g., for a high-power cellular base station), or a small cell (e.g., for a low-power cellular base station), or may function as an access point (e.g., for a short-range base station configured to communicate with short-range technology such as WiFi, WiFi-Direct (WiFi-D), Bluetooth®, Bluetooth®-low energy (BLE), Zigbee, etc.). One or more BSs, e.g., one or more of the gNBs 110a, 110b and/or the ng-eNB 114 may be configured to communicate with the UE 105 via multiple carriers. Each of the gNBs 110a. 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, UPFs 119, external clients or servers 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G. Long Term Evolution (LTE), etc. The gateway mobile location center (GMLC) 125, the location management function (LMF) 120, the access and mobility management function (AMF) 115, the SMF 117, the UPF 119, the ng-eNB (eNodeB) 114 and the gNBs (gNodeBs) 110a, 110b are examples and may, in various embodiments, be replaced by or include various other location server functionality and/or base station functionality respectively.

The communication system 100 is capable of wireless communication in that components of the communication system 100 can communicate with one another (at least sometimes using wireless connections) directly or indirectly, e.g., via the gNBs 110a, 110b, the ng-eNB 114, and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the communication system 100 and may communicate with each other and/or with the UE 105, the gNBs 110a. 110b, the ng-eNB 114, the core network 140, and/or the external client or server 130. For example, such other devices may include internet of thing (IoT) devices, medical devices, home entertainment and/or automation devices, etc. The core network 140 may communicate with the external client or server 130 (e.g., a computer system), e.g., to allow the external client or server 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM, CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Communications)). The communication system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client or server 130 (e.g., via the UPF 119 or the GMLC 125) and/or allow the external client or server 130 to receive location information regarding the UE 105 (e.g., via the GMLC 125) or RF sensing results from the UE 105 (e.g., via the UPF 119 and Internet 121).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geodetically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geodetically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another directly or via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a. 110b in the NG-RAN 135, possibly via one or more other gNBs and/or one or more other ng-eNBs. The ng-eNB 114 may provide LTE wireless access and/or evolved LTE (eLTE) wireless access to the UE 105.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The communication system 100 may include macro TRPs exclusively or the communication system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Time Difference of Arrival (TDOA) (e.g., Downlink TDOA (DL-TDOA) or Uplink TDOA (UL-TDOA)), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting a signaling connection to the UE 105.

The GMLC 125 may support a location request for the UE 105 received from the external client or server 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client or server 130. The GMLC 125 is shown connected to both the AMF 15 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (NRPPa), which may be defined in Technical Specification (TS) 38.455 defined by the Third Generation Partnership Project (3GPP). NRPPa messages may be transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 37.355. Here, LPP messages may be transferred between the UE 105 and the LMF 120 via the AMF 115 and the serving gNB 110a, 110b or the serving ng-eNB 114 for the UE 105. For example, LPP messages may be transferred between the LMF 120 and the AMF 115 using a Hypertext Transfer Protocol (HTTP) and may be transferred between the AMF 115 and the UE 105 using a 5G Non-Access Stratum (NAS) protocol. The LPP protocol may be used to support positioning of the UE 105 using UE-assisted and/or UE-based position methods such as A-GNSS, RTK, DL-TDOA and/or E-CID. The NRPPa protocol may be used to support positioning of the UE 105 using network-based position methods such as UL-TDOA and E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining downlink (DL) signals transmitted from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

An LPP message sent from the LMF 120 to the UE 105 may instruct the UE 105 to do any of a variety of things depending on desired functionality. For example, the LPP message could contain an instruction for the UE 105 to obtain measurements for GNSS (or A-GNSS), WLAN, E-CID, and/or DL-TDOA (or some other position method). In the case of E-CID, the LPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125.

Figure 2:
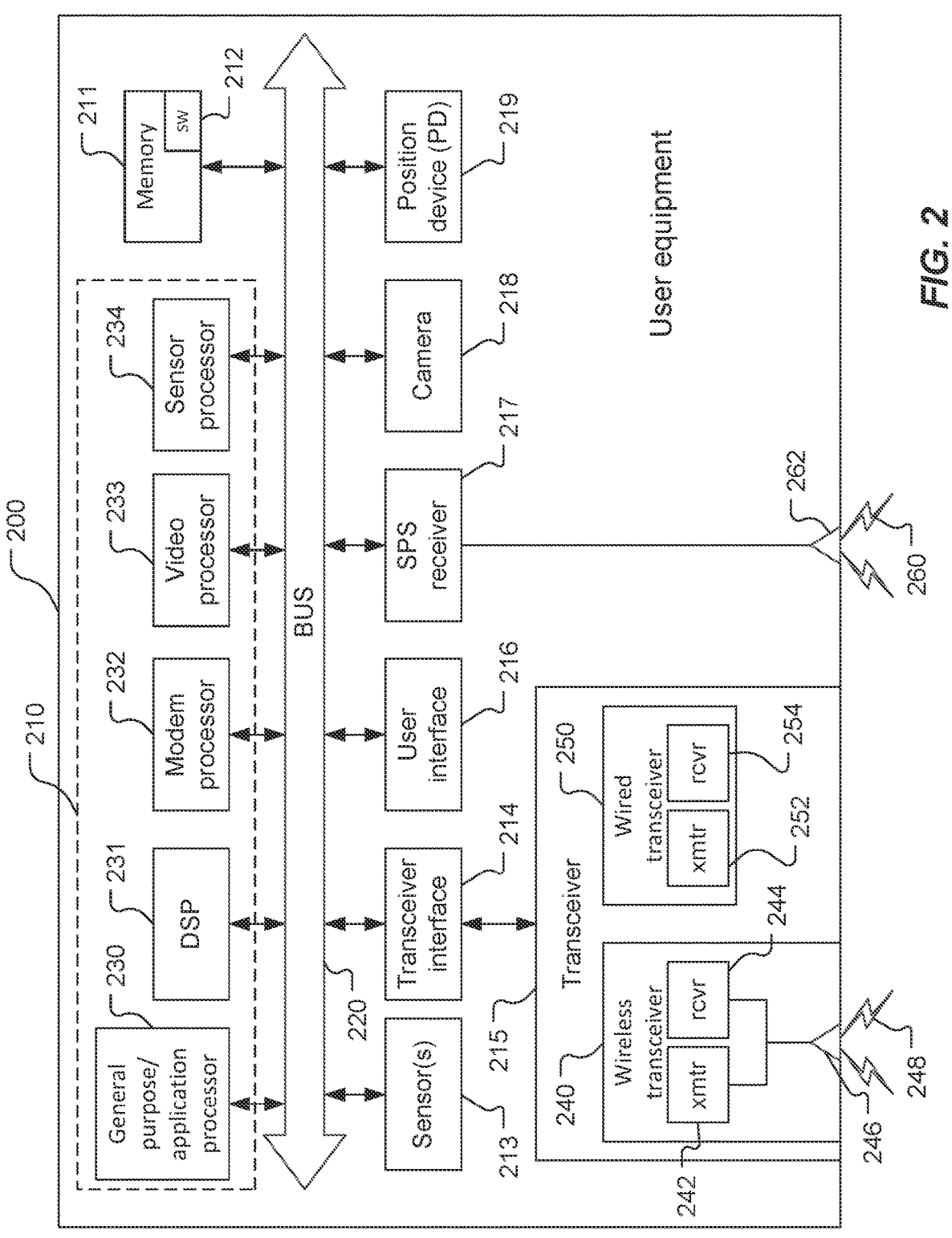
FIG. 2 is a block diagram of components of an example user equipment.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, IR cameras, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The one or more antennas 246 may comprise two (dual) antennas, four (quad) antennas or an antenna array, for example, in order to enable directional transmission and/or directional reception of RF sensing signals. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The transceiver 215 may be configured to send and receive other types of signals. For example, the transceiver 215 may be configured to send and receive radar, sonar, ultrasound, and/or light detection and ranging signals, e.g., under the control of the sensor processor 234. The wireless transmitter 242, the wireless receiver 244, and/or the antenna 246, may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
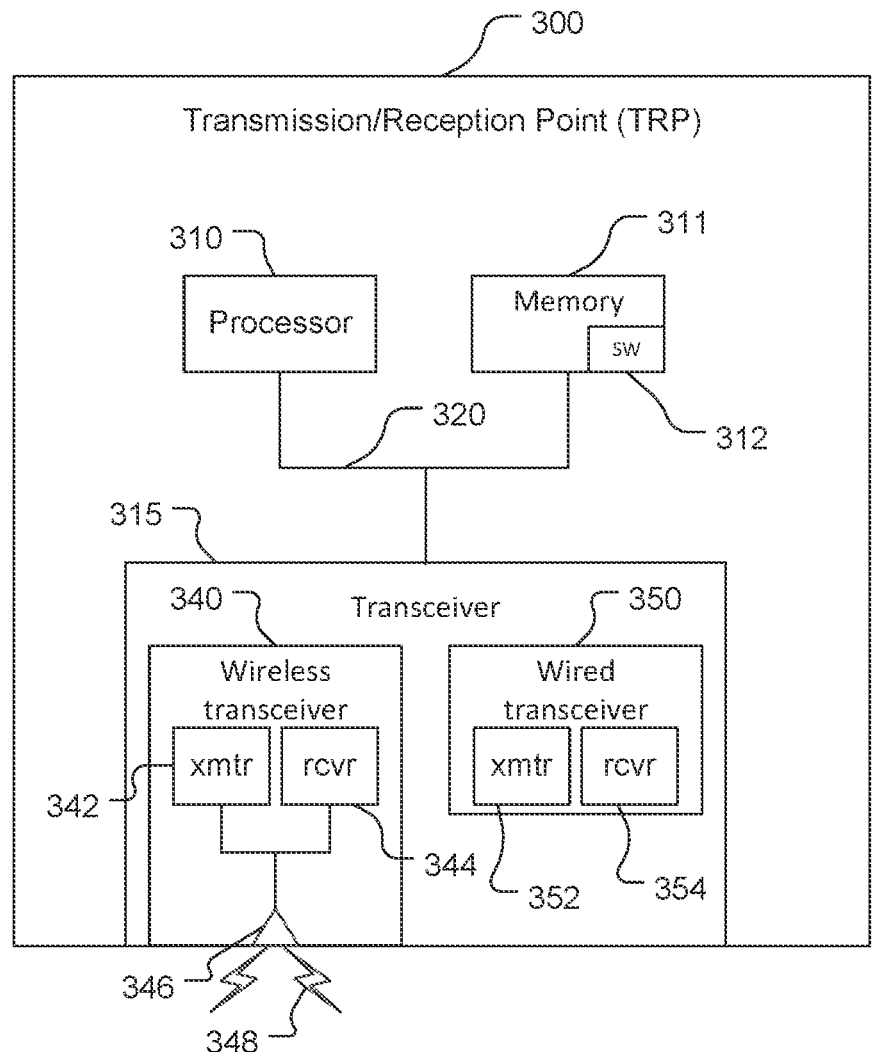
FIG. 3 is a block diagram of components of an example transmission/reception point.

Referring also to FIG. 3, an example of a TRP 300 of the gNBs 110*a*, 110*b* and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110*a*, 110*b* and/or the ng-cNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication. e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
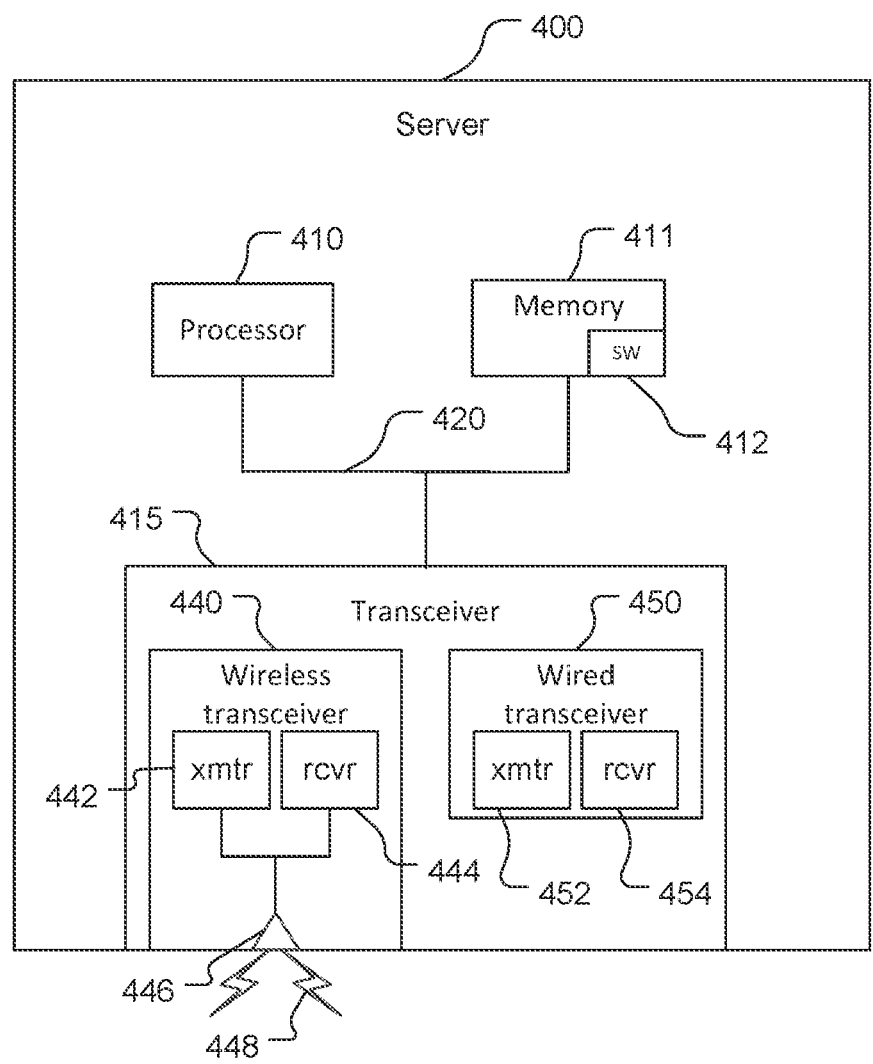
FIG. 4 is a block diagram of components of a server.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5A:
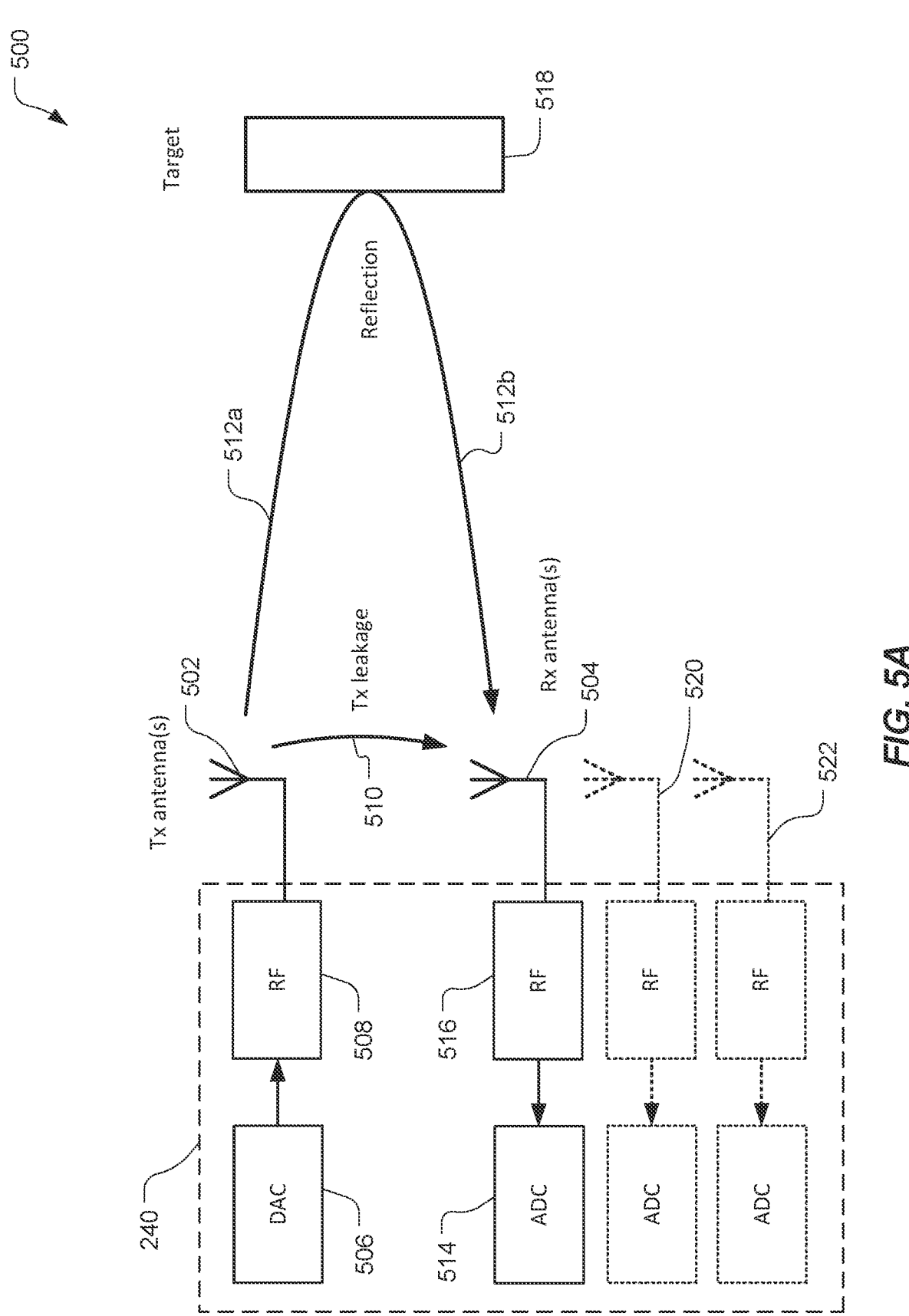
FIG. 5A is a diagram of radio frequency sensing with concurrent transmission and reception by an example wireless device.

Referring to FIG. 5A, an example diagram 500 of radio frequency sensing with concurrent transmission and reception by a wireless device is shown. The wireless device, such as the UE 200, UE 105, UE 106 or the TRP 300, includes a transceiver 240, or transceiver 340 with a plurality of transmit and receive chains configured for concurrent transmission and reception of RF signals. The number of transmit and receive chains in FIG. 5A are examples, and not limitations, as other transceiver and antenna configurations may be used. For example, the transceiver 240 may be configured for Multiple Input Multiple Output (MIMO) with two transmit and two receive chains. Other array sizes and configurations may be used. In an example, the transceiver 240 may include a transmit chain including a transmit antenna 502 operably coupled to a transmit RF module 508. The transmit RF module 508 is configured to receive a signal from a Digital-to-Analog Converter (DAC) 506 and transmit a corresponding RF signal via the transmit antenna 502. The signal may be generated by a processor such as the modem processor 232 and/or the general-purpose processor 230. The transceiver 240 may include one or more receive chains including a receive antenna 504, a receive RF module 516, and an Analog-to-Digital Converter (ADC) 514. Additional receive modules may also be used, such as a second receive chain 520 and a third receive chain 522.

In general, RF sensing uses one or more RF signals (e.g. WiFi signals or NR signals) comprising one or more waveforms, sequences, or packets to determine the presence and/or movement of an object. This may be done by using RF signals for channel capture, performing channel estimation to obtain a Channel Impulse Response (CIR), a Channel Frequency Response (CFR), and/or other forms of Channel State Information (CSI) indicative of the presence and/or movement of the object. The CSI is indicative of aspects of the RF signals such as multipath, reflections, and signal strength of each path. More broadly, CSI may represent the combined effect on RF signals of, for example, one or more of reflection, scattering, fading, refraction, attenuation, and/or power decay with distance. According to some embodiments, channel estimation used in forms of wireless communication systems can be used to obtain CSI. (In wireless communication, CSI is used to properly demodulate and decode a received packet.) Thus, embodiments can leverage existing channel estimation techniques to obtain CSI for RF sensing purposes.

In operation, the wireless device may transmit a radio frequency signal 512a towards a target 518. A reflected signal 512b is the portion of the RF signal 512a that is reflected (and/or diffracted or scattered) by the target 518 and received by the one or more receive antennas, such as the receive antenna 504. As used herein, the terms target, target object, and object mean a physical entity that is detectable with RF sensing. The additional receive chains may enable beamforming/direction detection to enable the wireless device to compute an angle of arrival (AoA) for a received signal. The receive chains may also receive a transmission leakage 510 concurrently with the transmission of the RF signal 512a. The transmission leakage 510 may be conductive and/or radiated interference depending on the configuration of the wireless device. For example, physical shielding may be used to reduce the radiated interference between the transmit and receive antennas. In an embodiment, the radio frequency signal 512a may be a pre-defined sequence with length 'L' (also referred to as just a "sequence"). The pre-defined sequence may be designed to have cyclic autocorrelation properties, such as single carrier Zadoff-Chu sequences, or Orthogonal frequency-division multiplexed (OFDM) like symbols.

The pre-defined sequence may be different to another pre-defined sequence used by another (e.g. nearby) wireless device in order to avoid receiving a transmission from the other wireless device and mistaking this for a reflection of the pre-defined sequence transmitted by the wireless device. In embodiments, the pre-defined sequence may be defined or encoded based on unique characteristic of the wireless device such as a global identity for the wireless device or a temporary identity of the wireless device provided by a serving network such as the 5GC 140. In other embodiments, part or all of the pre-defined sequence may be defined and provided to the wireless device by a serving network, such as the 5GC 140, or by a server, such as the external client or server 130, which may provide or define a different predefined sequence for each of a number of wireless devices in proximity to one another. The pre-defined sequence may be transmitted repeatedly and continuously for 'n' times, such that the receive chain(s) of the wireless device may start listening at a later time for length 'L' to receive the pre-defined sequence without missing the signal information. This relaxed time requirement on receive chains means they do not have to start at the same time as the transmitter.

The receive RF module 516 (and the additional receive chains 520, 522) may listen for and receive 'm' number of sequences instead of 1 sequence. For example, the receive RF module 516 may listen for a length of m*L, where 'm' is the number of sequences captured by the receive RF module 516, and m<=n. The wireless device (e.g. UE 200) may combine the received 'm' sequences to improve the signal-to-noise ratio (SNR). The received sequence can be used for RF sensing. For example, a known transmit sequence may be utilized to obtain a channel estimation based on signal correlation techniques. The channel estimation may be processed via an iterative cancellation algorithm to detect leakage and reflection. A time difference between leakage and reflection may be used to estimate a distance to the target 518.

In an example, multiple Rx antennas, such as the additional receive chains 520, 522 may be utilized to receive the sequence(s) in the reflected signal 512b, determine the channel estimation, and obtain an angle estimation of the reflected signal 512b. UEs commonly have 2 to 4 antennas. The CSI received via different Rx antennas can be used to determine angular information (e.g., by using Rx beamforming, determining angular information phase differences, or the like). In some implementations, embodiments with two antennas may achieve angular granularity of 10 degrees (10°) to 15°, for example, and embodiments with four antennas may achieve angular granularity of 2° to 3°. Moreover, in some other embodiments, an RF sensing system may have a plurality of Tx antennas (e.g., 2 to 4 antennas). The phase of the Tx antennas may be configured to transmit the RF signal in a beam pointing at a certain direction. In some implementations, embodiments with two Tx antennas may achieve an angular granularity of 10° to 15°, for example, and embodiments with four Tx antennas may achieve a granularity of 2° to 3°. Changes in CSI over time (e.g., from one scan to the next) are indicative of motion of the target 518. Changes may include changes in amplitude or phase of CSI. Additionally or alternatively, changes may comprise changes in the metrics extracted and/or estimated from CSI, such as time of flight and angle of each reflected path, etc. Thus, RF signals can be used to determine attributes of a target object such as location, volume, and movement. In an example, classification algorithms and/or machine learning on the channel estimation results may be used to identify the type of motion and/or size of the target 518. In an example, the channel estimation may be used to detect changes in the orientation, size, shape and/or pose of the target 518.

The number of transmit and receive chains on the wireless device of FIG. 5A is an example, and not a limitation. Other wireless devices may have multiple arrays, and each array may be comprised of different numbers and patterns of antenna elements. For example, an antenna array may include a matrix of elements in a 1×2, 1×4, 1×5, 1×8, 2×2, 2×4, 2×5, 2×8, 3×4, 3×5, 3×8, etc. Other antenna array matrix dimensions may also be used.

In an embodiment, the wireless device with one or more multi-element antenna arrays may be configured to beamform transmitted and received RF signals. For example, the transceiver 240 may include a radio frequency integrated circuit (RFIC) including phase shifters to modify the transmit and receive beam gains. The wireless device may be configured to vary the angle of departure (AoD) of the RF signal 512a. In an example, the RF signal 512a may be swept through different AoDs. and the gain of the corresponding reflected signals may be determined. Varying the AoD of the RF signal 512a may be used to determine a direct path to the target 518 (e.g., based on the highest reflected gain). In an example, the beam sweeping may be used to determine changing orientations, sizes, shapes and/or poses of the object (e.g., based on a series of reflected signals over time). In an embodiment, the transmitted RF signal 512a may be a polarized signal and the polarization of the received signal 512b may be detected. The change in the polarization between the transmitted and received signal may be used to determine characteristics and/or classify the target 518.

In an example, the general-purpose processor 230 and/or the DSP 231 may be configured to determine the distance, velocity, and/or size of a target object. The distance may be measured based on the pulse delay associated with the transmission of the RF signal 512a and the reception of the received signal 512b. The velocity of a target object may be obtained based on a doppler shift of the RF signal 512a when the reflection is received. Angular direction may be based on varying the AoD of the RF signal. Signature analysis and inverse scattering techniques as known in the art may be used to detect other attributes of a target object. For example, the size of a target object may be based on the magnitude of the received signal 512b and the presence of moving parts on a target object may be based on the modulation of the received signal 512b.

Referring to FIG. 5B, with further reference to FIG. 5A, a graph 550 of an example receive signal is shown. The graph 550 includes a relative power axis 552, a time axis 554, and a signal response function 556. The signal response function 556 represents the signal detected by the receive antenna 504. A first peak 558 is based on the transmission leakage 510, and a second peak 560 is based on the reflected signal 512b. The RF module 516 (and the other receive chains 520, 522) may be configured to reduce the receive gain for the duration of the transmission of the RF signal 512a. For example, one or more amplifier components (e.g., Low Noise Amplifiers (LNAs)) in the receivers may be configured with adjustable gain functionality. The receive gain may be reduced to lessen the impact of the leakage on the receive chains. Other iterative cancellation algorithms may be used to reduce the impact of the first peak 558 and improve the detection of the second peak 560. The transmission gain of the RF transmit module 508 may be increased to improve the detection of the reflected signal 512b. For example, the transmission gain may be increased iteratively for each of the sequences based on the values of the peak or peaks associated with the reflected signal 512b.

In operation, the signal response function 556 includes the transmitted sequences and the corresponding ADC capture in the ADC module 514 is equivalent to channel capture, which may be utilized to enable channel capture based on RF sensing use cases. The time difference between the first peak 558 (i.e., the time of transmission) and the second peak 560 (i.e., the reflected signal 512b) may be utilized to estimate the distance to the target 518. The AoA of the reflected signal 512b may be obtained based on the ADC capture from multiple antennas (e.g., additional receive chains 520, 522). The measured distance and direction information to the target 518 may be used in an indoor mapping application. The bandwidth of the transmitted RF signal 512a may vary and is not limited to a Wi-Fi packet bandwidth. For example, wide bandwidths may be based on the DAC and ADC rates and analog filter bandwidths which may be larger than the Wi-Fi packet bandwidth. The transmission and reception of the RF signals 512a may be performed within hundreds of microseconds and thus the impact on Wi-Fi communications may be minimal. Thus, the RF sensing techniques described herein may be used concurrently with Wi-Fi data exchange functionality.

The properties of the transmitted RF signals 512a may vary, depending on the technologies utilized. The RF sensing techniques provided herein may apply to WLAN technologies, which typically operate at 2.4, 5, and 6 GHz, but may include frequencies ranging from 900 MHz to 60 GHz. Other frequency ranges may also be used. For example, frequencies utilized by the 802.1 lad Wi-Fi standard (operating at 60 GHz). Because WLAN sensing may be performed in the same frequency bands as communication, hardware may be utilized for both communication and WLAN sensing. For example, one or more of the components of the UE 200 may be included in a wireless modem (e.g., Wi-Fi or 5G modem) of a television. Other RF communication technologies and signals may also be used, such as Ultra-Wideband (UWB) transceivers, and Orthogonal Frequency-Division Multiplexing (OFDM) Long Training Field (LTF)-like symbols for channel capture to determine the presence and/or movement of a target object. In an example, known channel estimation techniques such as Legacy Long Training Field (L-LTF) and High Throughput (HT)/Very High Throughput (VHT)/High-Efficiency Long Training Field (HE-LTF) in a communication packet preamble may be used. Embodiments may use a similar approach, for example, by using a known transmitted signal for channel estimation.

Figure 6:
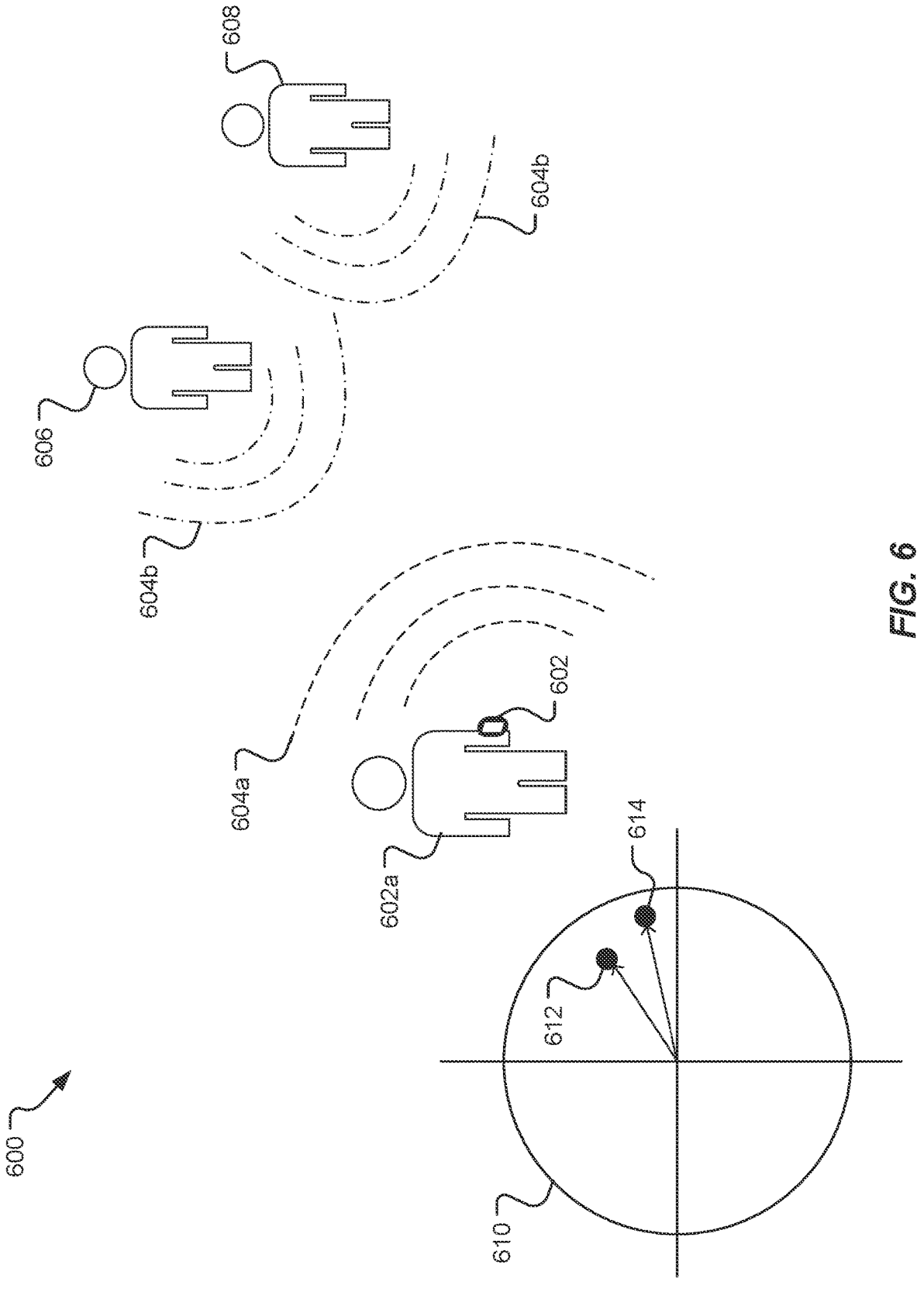
FIG. 6 is a diagram of an example use case for detecting a crowd with radio frequency sensing.

Referring to FIG. 6, a diagram 600 of an example use case for detecting a crowd with radio frequency sensing is shown. The diagram 600 includes a first wireless node such as a first UE 602 configured to perform RF sensing. The first UE 602 may be a smartphone, or other mobile device (e.g. a UE 200, 105 or 106), in the possession of a first user 602*a*. The first user 602*a* may be proximate to a crowd including at least a first pedestrian 606 and a second pedestrian 608. The pedestrians 606, 608 may or may not have mobile devices, but in either case the pedestrians 606, 608 are not required to have mobile devices to enable the crowd sensing techniques described herein. The first UE 602 may transmit RF sensing signals 604*a*, as described in FIGS. 5A and 5B, and receive reflected signals 604*b* returning from the pedestrians 606, 608. In an example, the first UE 602 may be configured to determine range and bearing information based on the reflected signals 604*b*. For example, AoA techniques may be used to determine bearings to the pedestrians, and time of flight techniques may be used to compute the range. A first polar plot 610 depicts the results of the RF scanning with a first target indication 612 corresponding to the relative location of the first pedestrian 606, and a second target indication 614 corresponding to the relative location of the second pedestrian 608. The first UE 602 may be configured to report the target indications 612, 614 (e.g., range and bearing parameters), along with state information for the UE 602 to a network server for crowdsourcing the RF sensing results. The state information may include a current location of the UE 602 (e.g., based on satellite or other terrestrial techniques), and other orientation information such as a direction of motion, velocity, magnetic heading, and other sensor information to enable a network resource to translate a local coordinate system of the UE 602 (e.g., relative bearings) to a global coordinate system.

Figure 7A:
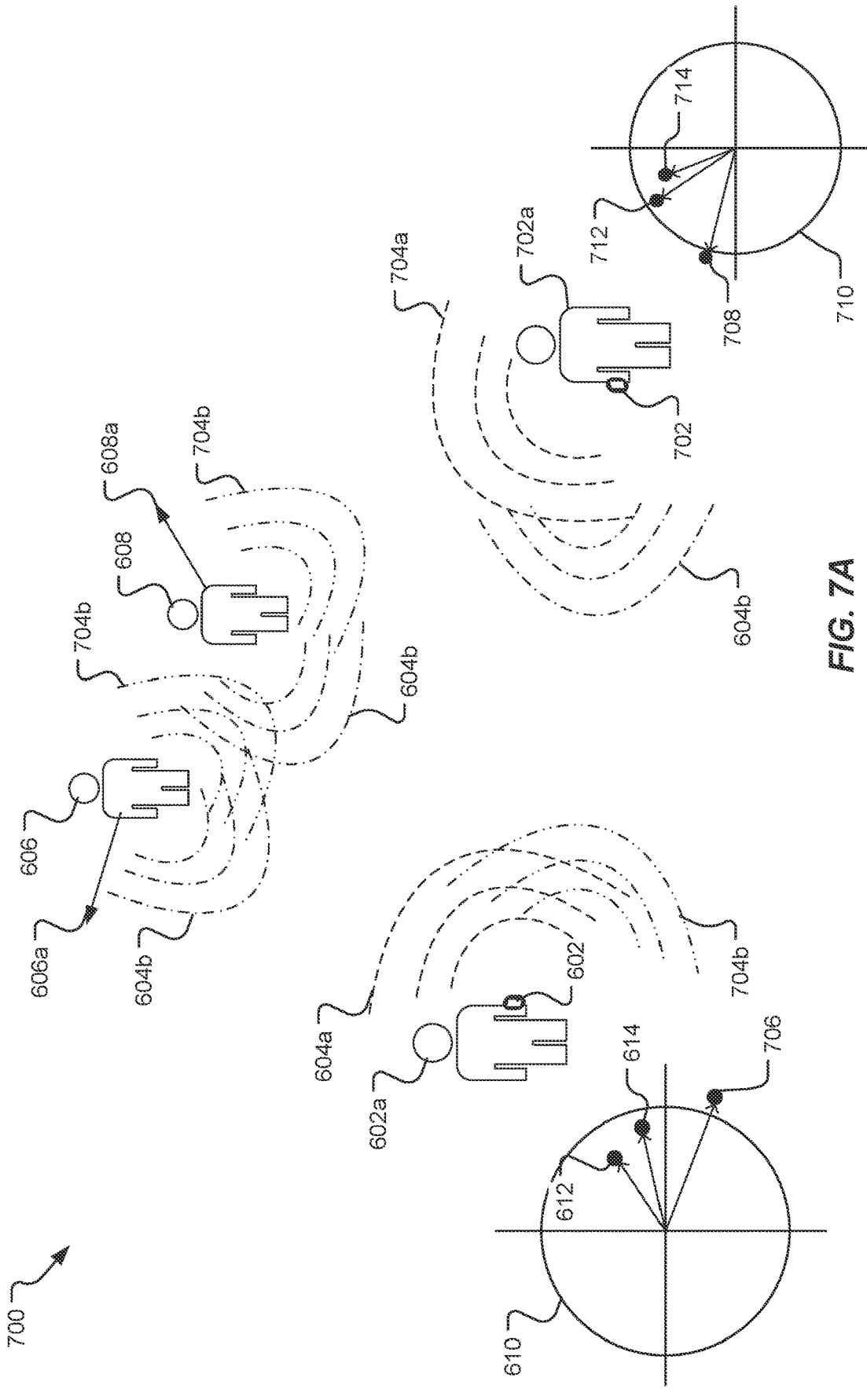
FIG. 7A is a diagram of an example use case for detecting a crowd with multiple wireless nodes configured for radio frequency sensing.

Referring to FIG. 7A, with further reference to FIG. 6, a diagram 700 of an example use case for detecting a crowd with multiple wireless nodes configured for radio frequency is shown. The diagram 700 includes the first user 602*a* with the first UE 602 and the pedestrians 606, 608 in addition to a second user 702*a* with a second wireless node, such as a second UE 702 (e.g. which may be a UE 200, 105 or 106). The second UE 702 is configured to perform RF sensing operations and may transmit an RF sensing signal 704*a*, and receive reflected signals 704*b* based on the locations of the pedestrians 606, 608 and the first user 602*a*. Similarly, the first UE 602 may receive reflected signals 604*b* based on the location of the second user 702*a*, and may determine a third target indication 706 based on the range and bearing to the second user 702*a*. In an example, a network server 400 may be configured as a RF sensing crowdsourcing server and may provide RF sensing assistance data to the first and second UEs 602, 702 to configure the RF sensing signals 604*a*, 704*a*. For example, the RF sensing assistance data may include beam configuration information such as frequency, bandwidth, and timing information such that the RF sensing signals 604*a*, 704*a* may not interfere with one another. In an example, the RF sensing signals 604*a*. 704*a* may be based on orthogonal components in an OFDM schema. The second UE 702 may determine a first target indication 712 based on the relative location of the first pedestrian 606, a second target indication 714 based on the relative location of the second pedestrian 608, and a third target indication 708 based on the relative location of the first user 602*a*. The target indications 708, 712, 714 are depicted on the second example polar plot 710. The first UE 602 and the second UE 702 may provide UE state information and their respective target indications to an RF sensing crowdsourcing server to enable aggregation of the RF sensing reports and analysis of the sensor data. In an example, the UEs 602, 702 may be configured to perform RF sensing and provide sensing reports on a periodic basis and/or as directed by a network or the RF sensing crowdsourcing server.

In an example, the UEs 602, 702 may be configured to determine attributes associated with target objects. The attributes may be based on characteristics of the reflected RF signals 604*b*, 704*b*. For example, doppler shift, a change of range and/or AoA drift may be used to estimate motion vectors associated with target objects. For example, the first pedestrian 606 may be associated with a first motion 606*a* and the second pedestrian 608 may be associated with a second motion 608*a*. The UEs 602, 702 may be configured to determine other attributes associated with target objects such as size, pose/orientation, and composition based on the RF signal characteristics. In an example, the UEs 602, 702 may be configured to determine the attributes for target objects and provide the attribute information to the server 400 with the target indication information. The attributes of a target object may be used to identify and/or track an object. The attributes for a target object that is a person may include a height, width, pose (e.g. sitting, standing, walking, running), orientation (e.g. side facing, front facing or back facing), type of clothing, whether carrying a bag or other object(s). The attributes for a target object that is a vehicle may include a length, width, height, speed and/or a pattern or signature of a reflected RF signal that is indicative of a particular type, make and/or model of a vehicle (e.g. truck, SUV, compact car, mid-size car, Ford, Chevrolet, Buick, Lexus, Dodge Ram, Toyota Highlander, Audi A4, etc.). The attributes for a target object that is a drone may include a length, width, height, cross-sectional area, horizontal location, altitude, speed, direction of motion, and/or a pattern or signature of a reflected RF signal that is indicative of a particular type, make or model of a drone (e.g. multi-rotor, fixed-wing, single-rotor, number of rotors, DJI Matrice 300 RTK, Skydio 2+, Autel Robotics Evo Lite+, etc.).

In these examples, each of the UEs 602, 702 may analyze the reflected RF signals 604*b*, 704*b*, respectively, to determine the attributes and may provide the attributes to a server rather than provide raw signal information for the reflected RF signals 604*b*, 704*b* to the server.

In another example, the UEs 602, 702 may be configured to provide RF sensing signal information (e.g. RF signal characteristics which may not be analyzed and interpreted by the UEs 602, 702) to the server 400. The server 400 may then be configured to detect target objects and determine attributes of the target objects. For example, the UEs 602, 702 may provide state information (e.g., UE location, UE transmit power, UE orientation, etc.) along with time domain and/or frequency domain components of the reflected signals. In an example, the UEs 602, 702 may be configured to perform an analog-to-digital conversion of a received RF sensing signal and provide a digital representation of the RF sensing signal to the server 400. For example, the server 400 may be configured to analyze the frequencies of the reflected RF sensing signals 604*b*, 704*b* to detect shifts (e.g., doppler) associated with the pedestrians 606, 608 and estimate the motion of the pedestrians 606, 608 based on the respective frequency shifts and states/locations of the UEs 602, 702. The server 400 may be configured to determine other attributes associated with target objects as well.

The server 400 may aggregate the attributes and/or the RF sensing signal information provided by and received from the UEs 602 and 702. In the example diagram 700, the UEs 602 and 702 can both provide attributes and/or RF sensing signal information for the pedestrians 606 and 608. By aggregating (i.e. combining) this information, the server 400 may be able to obtain or infer more information for the pedestrians 606 and 608 than can be obtained or inferred from the attributes and/or the RF sensing signal information provided by just one UE (e.g. by UE 602 or UE 702 alone). For example, by aggregating the information, the server may be able to obtain or infer a more accurate location, speed and/or direction of movement, size, weight, pose, gait, type of clothing, a carrying of a bag or package for either or both of the pedestrians 606 and 608. This may be possible partly because UEs 602 and 702 are at different locations and transmit RF sensing signals 604*a* and 704*a*, respectively, and receive reflected signals 604*b* and 704*b*, respectively, that strike pedestrians 606 and 608 and are reflected or scattered by pedestrians 606 and 608, respectively, at different angles and directions. Different ranges, different AoAs and/or different doppler shifts for each pedestrian 606 and 608 obtained (e.g. by UE 602, UE 702 and/or server 400) may then be used to triangulate or trilaterate a more accurate location, speed and/or direction of motion for each pedestrian 606 and 608. Similarly, signal characteristics of reflected signals 604*b* and 704*b* may both indicate a certain type of clothing (e.g. based on certain types of clothing reflecting signals more strongly than others) or may both indicate the carrying of a package or bag (e.g. based on a greater strength of a reflected signal).

Figure 7B:
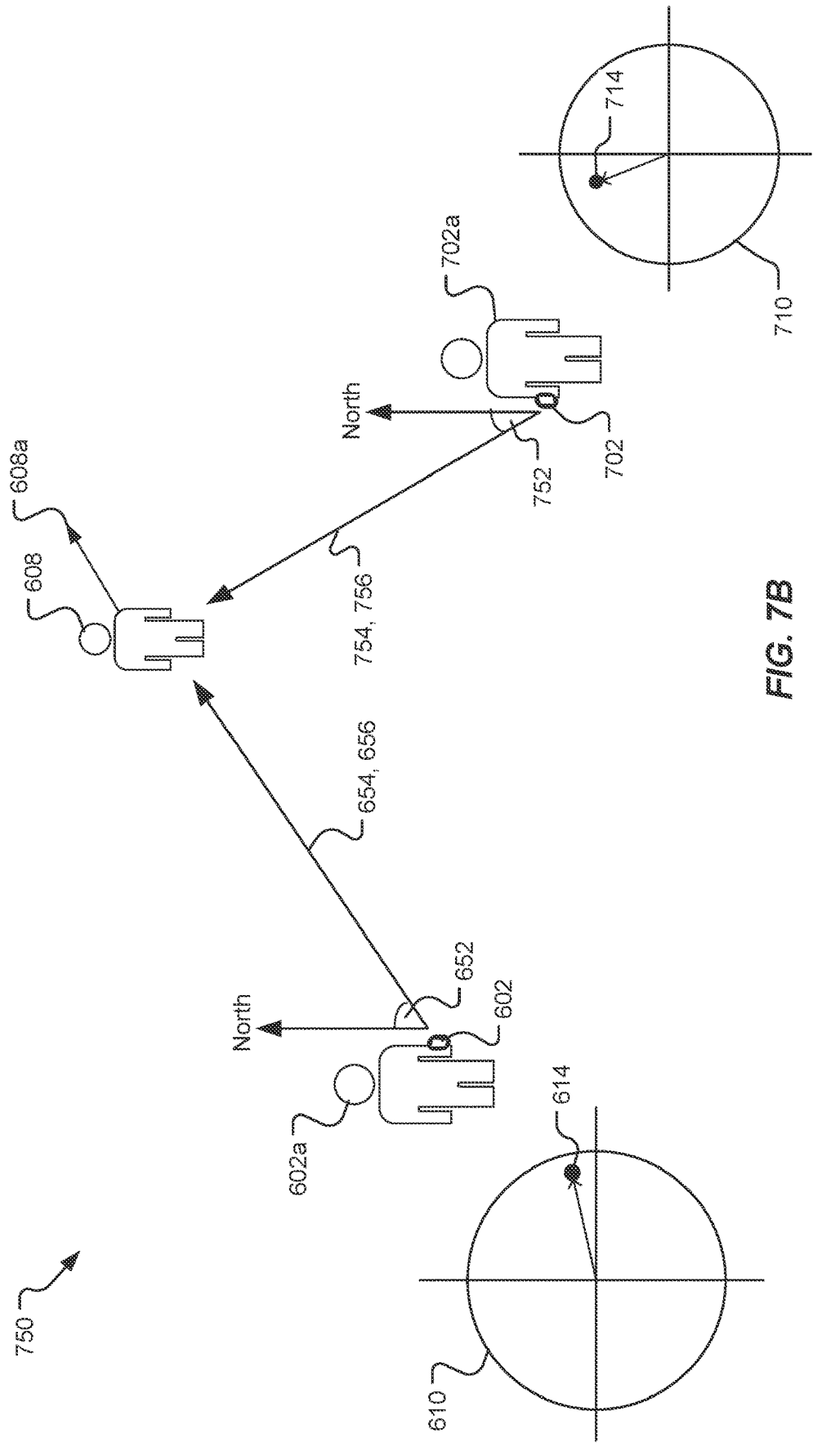
FIG. 7B is a diagram of an example use case for improving detection of a target object with multiple wireless nodes configured for radio frequency sensing.

Referring to FIG. 7B, with further reference to FIG. 7A, a diagram 750 of an example use case for improving detection of a single target object with multiple wireless nodes configured for radio frequency sensing is shown. The diagram 750 includes the first user 602*a* with the first UE 602, the second user 702*a* with the second UE 702 and the pedestrian 608. The first polar plot 610 showing the target indication 614 results of the RF scanning by UE 602 of the pedestrian 608 and the second polar plot 710 showing the target indication 714 results of the RF scanning by UE 702 of the pedestrian 608 are also shown. The target indication 614 results may include a bearing 652 (e.g. a bearing relative to true North), a range 654 and a velocity component 656 (which may be obtained from a doppler shift) of the pedestrian 608 as sensed at the location of the first UE 602. Similarly, target indication 714 results may include a bearing 752, a range 754 and a velocity component 756 (which may be obtained from a doppler shift) of the pedestrian 608 as sensed at the location of the second UE 702. If the locations of the two UEs 602 and 702 are known, the location of the pedestrian 608 may be uniquely obtained from any of: the bearing 652 and range 654; the bearing 752 and range 754 or the bearing 652 and the bearing 752. That is, only two of the four variables are needed to locate the pedestrian 608. The additional two variable can then be used to improve the accuracy of the location of the pedestrian 608. For example, if there are measurement errors in any or all of the bearing 652, the range 654, the bearing 752 and the range 754, then all four variables may be combined to calculate a location with a smaller expected error than the location calculated using just two (or three) of the four variables—e.g. using a method of least squares. The location accuracy could be further improved if bearing and range results for the pedestrian 608 were provided by RF sensing results from additional UEs (not shown in FIG. 7B). Similarly, the motion 608*a* of the pedestrian 608 (e.g. a speed and direction of walking or running) may be calculated from the velocity components 656 and 756 determined by the two UEs 602 and 702 based on simple vector algebra. As for location calculation, the accuracy of the velocity calculation could be further improved if velocity components for pedestrian 608 were provided by RF sensing results from additional UEs.

One problem in aggregating RF sensing results from multiple UEs for a common target object, as discussed for diagrams 700 and 750, may be to ensure that the RF sensing results from the multiple UEs apply to the same target object and not to different target objects. One way to accomplish this may be to obtain RF sensing results from each UE for multiple target objects at about the same time where the multiple target objects may include both stationary and moving target objects. The RF sensing results for the stationary target objects may be used to compare RF sensing results between different UEs. For example, if two UEs obtain RF sensing results which indicate a number of stationary target objects (e.g. buildings, walls, trees, lamp posts, traffic lights) at approximately the same locations, then indications of moving target objects may become more easy to associate. For example, if two UEs sense a first moving target object midway between two stationary target objects each of whose locations are indicated to be approximately the same according to the RF sensing results from the two UEs, and if neither UE senses another moving target object nearby to the first moving target object, then it may be assumed that the two UEs are sensing the same first moving target object.

This observation may be generalized to RF sensing results provided by multiple UEs, where the RF sensing results from each UE indicate a number of stationary and moving target objects. A server may combine the indications for the stationary and moving target objects, e.g. by computing a geographic map of the stationary and moving target objects indicated by the RF sensing results provided by each UE. If the stationary target objects sensed by each UE generally align with the stationary target objects sensed by other UEs, then the server may use the locations of the stationary target objects as reference points to define and evaluate the locations of the moving target objects. The server may assume that a moving target object sensed by different UEs is the same moving target object if the location of the moving target object is the approximately same relative to the stationary target objects for each UE. Sensing results from a small number of UEs which are not aligned may be ignored as errors and locations and movement inferred from the RF sensing results from other UEs may be further subject to statistical averaging to further improve accuracy.

While example diagrams 700 and 750 show only two sensing UEs 602 and 702, there could be many other UEs nearby to pedestrians 606 and 608 (not shown in FIGS. 7A and 7B) that might be able to send attributes and/or RF sensing signal information for the pedestrians 606 and 608 to the server 400 based on transmission of RF sensing signals and reception of reflected or scattered signals similar to that described for UEs 602 and 702. In that case, server 400 could have access to information related to attributes such as location, speed and/or direction of movement, size, weight, pose, gait, type of clothing, a carrying of a bag or package for either or both of the pedestrians 606 and 608 obtained by UEs at many different directions and distances to the pedestrians 606 and 608 which might greatly improve the accuracy and reliability of the determination of these attributes by the server 400.

Figure 8A:
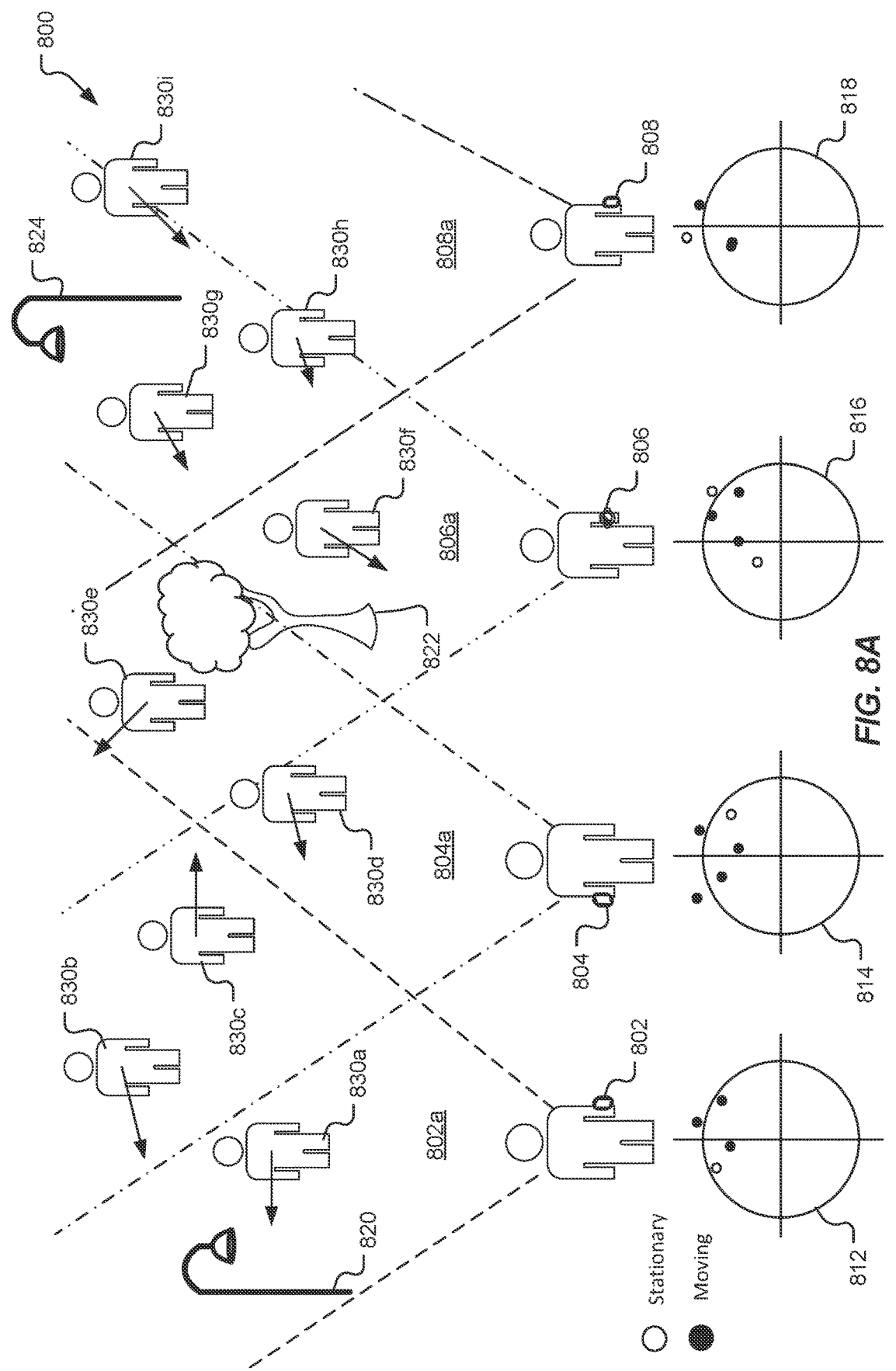
FIG. 8A is a diagram of an example use case for detecting stationary objects in a crowd with radio frequency sensing.

Referring to FIG. 8A, a diagram 800 of an example use case for detecting stationary objects in a crowd with radio frequency sensing is shown. The diagram 800 includes a plurality of wireless nodes (also referred to as wireless devices) (e.g. UEs 200, 105, 106) configured for RF sensing, such as a first UE 802, a second UE 804, a third UE 806 and a fourth UE 808. The UEs 802, 804, 806, 808 are oriented such that the RF sensing operations for each of the UEs covers a limited area, such as a first area 802*a* for the first UE 802, a second area 804*a* for the second UE 804, a third area 806*a* for the third UE 806, and a fourth area 808*a* for the fourth UE 808. The locations of the UEs and respective coverage areas are examples and not limitations as the UEs may be in other locations and may have different coverage areas. The diagram 800 includes a crowd of moving pedestrians 830*a-i* among examples of stationary inanimate objects such as a first lamp post 820, a tree 822 and a second lamp post 824. The UEs 802, 804, 806, 808, or the RF sensing crowdsourcing server, may be configured to detect the stationary inanimate objects to improve the crowd estimates (e.g., to exclude the inanimate objects from the crowd count). In an embodiment, the UEs 802, 804, 806, 808 may be configured to compute relative range, bearing and motion information based on the RF sensing operations such as depicted in the respective polar plots 812, 814, 816, 818. For example, the UEs 802, 804, 806, 808 may be configured to utilize doppler shifts and/or changes in range and/or AoA in the RF signal reflections to detect motion. Multiple measurements obtained over a time period may also be used to detect whether a target object is moving or is stationary. Other RF signal parameters may also be used to classify a target object.

The diagram 800 illustrates how a server (e.g. server 400) may obtain RF sensing results from many wireless devices (in this case UEs 802, 804, 806, 808), which may enable RF sensing of a larger area or larger volume than can be sensed by any one wireless device by itself. In this example, the UEs 802, 804, 806, 808 can provide RF sensing results for an area comprising first area 802*a*, second area 804*a*, third area 806*a* and fourth area 808*a*. When certain ones of the first area 802*a*, the second area 804*a*, the third area 806*a* and the fourth area 808*a* are partially (or even completely) overlapping, RF sensing results may be provided by two or more of the UEs 802, 804, 806, 808 for the same target object (e.g. a person, a vehicle, an animal, a drone or some other object), which may improve the accuracy and reliability of inferring attributes for the target object as discussed above for diagrams 700 and 750. Therefore, by using multiple sensing wireless devices, a server may be able to obtain or infer attributes for target objects over both a larger area or volume and with greater accuracy and reliability.

Figure 8B:
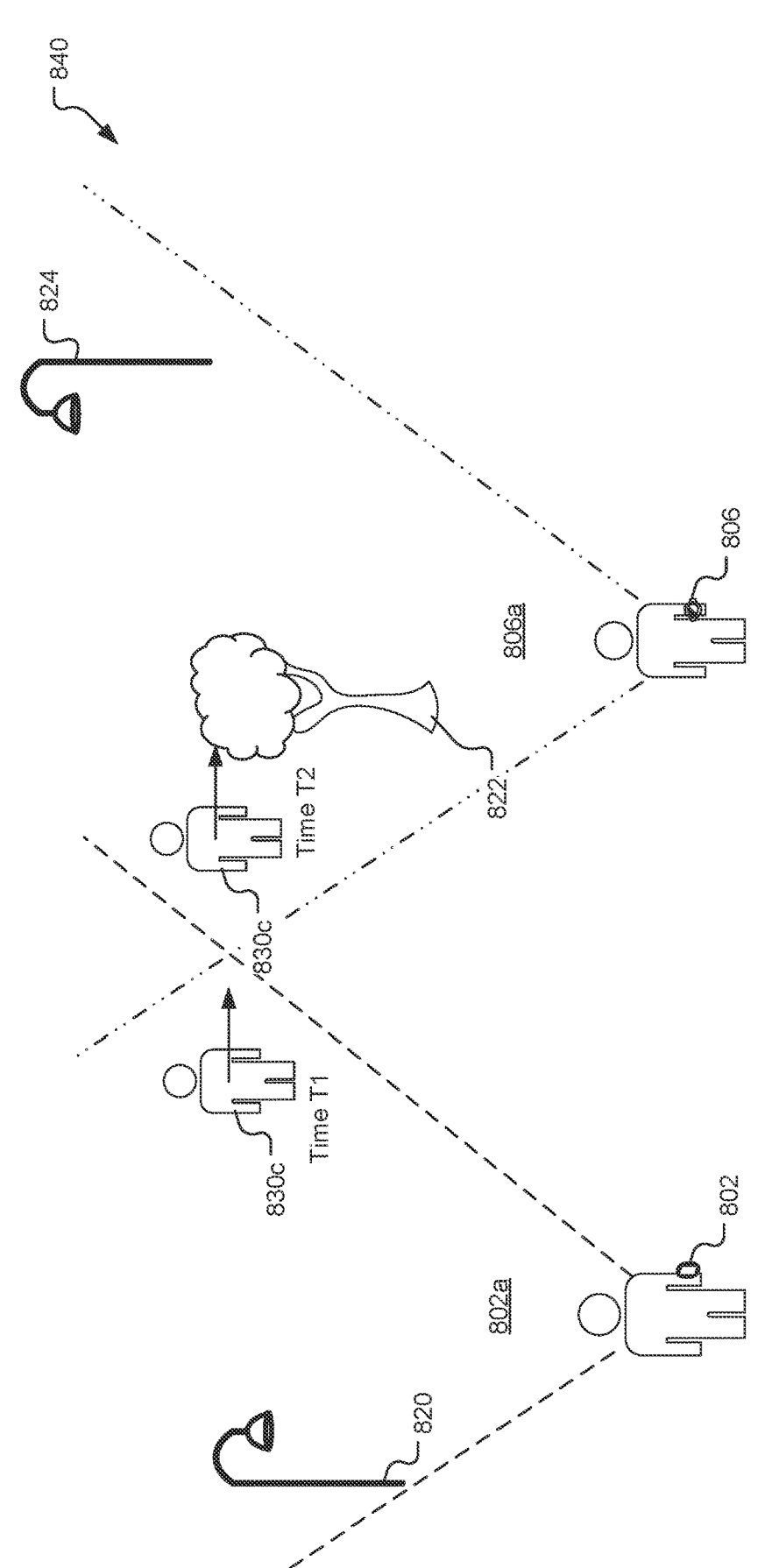
FIG. 8B is a diagram of an example use case for tracking moving objects with radio frequency sensing.

Referring to FIG. 8B, a diagram 840 of an example use case for tracking moving objects with radio frequency sensing is shown. Diagram 840 shows some of the UEs and moving pedestrians 830 shown and described previously for diagram 800. In an embodiment, in which a moving target object is being tracked, an LMF 120 or server 400 may determine the presence of the moving target object in a first area that can be sensed by a first set of UEs and may obtain or infer attributes of the target object (e.g. location, speed, direction of movement) which imply that the target object will enter a second area at some nearby future time. The LMF 120 or server 400 may then send sensing assistance data to a second set of UEs that are able to perform RF sensing in the second area and may include information in the sensing assistance data to enable the second set of UEs to obtain RF sensing results for the target object. In this way, tracking of the target object may be handed off from the first set of UEs to the second set of UEs without loss of RF sensing results for the target object for any significant time (e.g. more than 3 seconds). In the example shown in FIG. 8B, the first area can be the area 802*a*, the second area can be the area 806*a*, the first set of UEs can be the UE 802, the second set of UEs can be the UE 806 and the moving target object is the pedestrian 830*c*. At time T1, the pedestrian 830*c* is in area 802*a* and is being tracked by the UE 802. At time T2, the pedestrian 830*c* has moved into the area 806*a* and is being tracked by the UE 806. At or shortly after time T1, an LMF 120 or server 400 that has received RF sensing results from the UE 802 may send assistance data to the UE 806 indicating that the pedestrian 830*c* will shortly be visible in the area 806*a* and may provide an expected location, an expected time (e.g. time T2) and expected speed or velocity of the pedestrian 830*c* together with other attributes of the pedestrian 830*c* such as approximate height, size, type of clothing etc. This may enable UE 806 to detect the pedestrian 830*c* from RF sensing results obtained by the UE 806 and to specifically track the pedestrian 830*c* and provide associated RF sensing results to the LMF 120 or server 400.

Figure 8C:
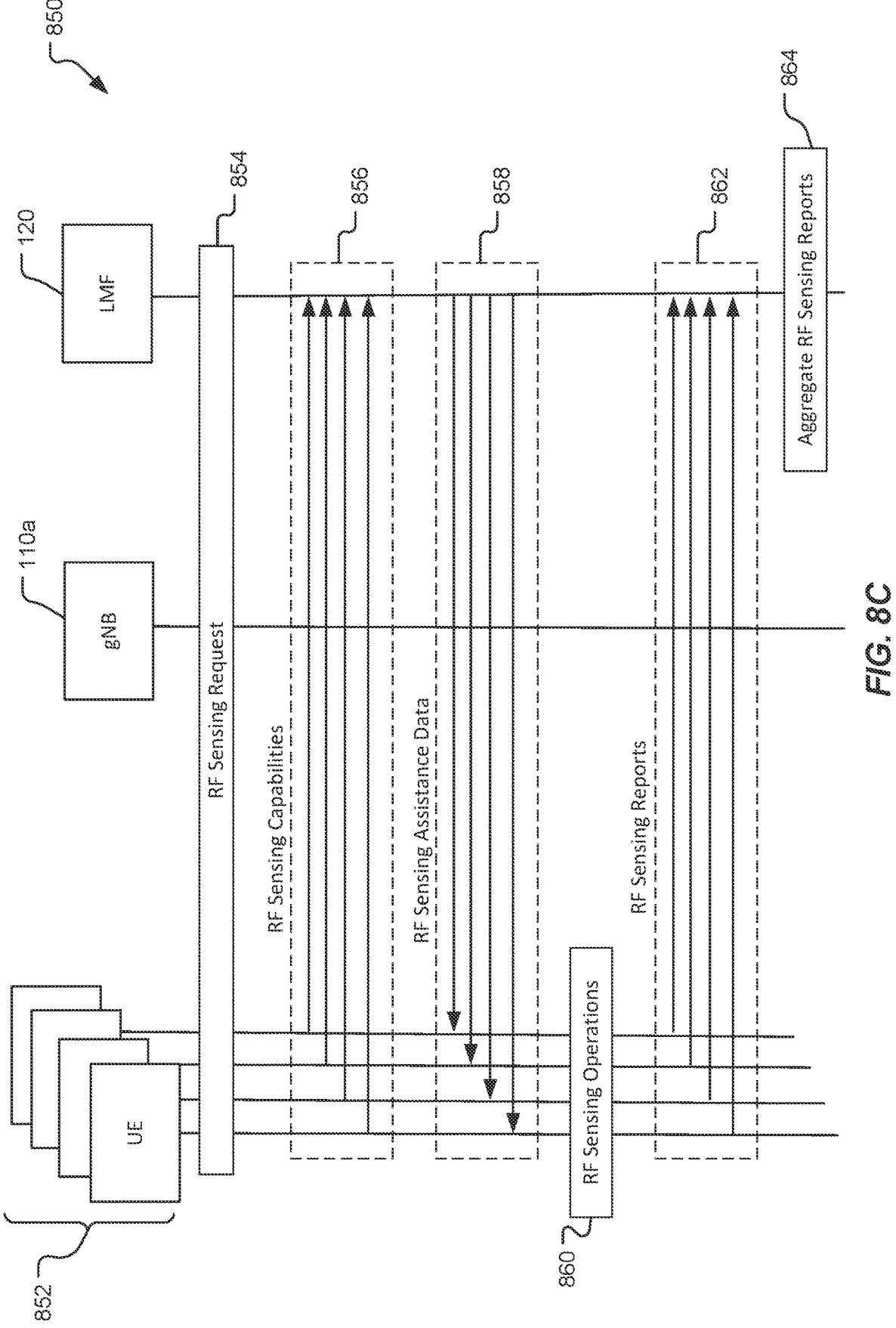
FIG. 8C is an example message flow for performing crowd sensing using multiple wireless nodes.

In operation, referring to FIG. 8C, an example message flow 850 for performing crowd sensing operations is shown. The message flow 850 is an example, and not a limitation as other messages may be used within the communication system 100 to obtain RF sensing information from network nodes. The flow 850 includes a RF sensing crowdsensing server, such as the LMF 120 or another server 400, a base station such as the gNB 110*a*, and a plurality of wireless nodes, such as the UEs 852 (e.g. which may be instances of a UE 105 or UE 106). The UEs 852 may include some or all of the components of the UE 200, and the UE 200 is an example of one of the UEs 852. In the use case depicted in FIG. 8C, the UEs 852 may include the UEs 802, 804, 806, 808. In an example, the LMF 120 (or other crowdsourcing server) may be configured to send RF sensing request messages 854 to one or more of the UEs 852, e.g. via LPP or TCP/IP messaging. The UEs 852 may respond with RF sensing capabilities messages 856 to indicate their respective capabilities to participate in RF sensing operations. For example, UEs actively engaged in communication applications (e.g., voice, video, data, etc.), or other processor and/or bandwidth intensive operations, may not be capable of participating in the requested RF sensing operations. The RF sensing capabilities messages 856 may also include parameter information regarding the capabilities of the UEs 852 for performing RF sensing operations (e.g., location, orientation, bandwidth, power, frequency range, beamwidths, etc.). The LMF 120 may generate and provide RF sensing assistance data messages 858 including RF sensing configuration information to enable the UEs 852 to jointly perform RF sensing operations. The RF sensing assistance data messages 858 may be provided via LPP messaging, IP messaging or TCP/IP messaging. In an example, the RF sensing assistance data messages 858 may include sector information to define where a UE will perform RF sensing (e.g., the areas 802*a*, 804*a*, 806*a*, 808*a* in FIG. 8A), as well as transmitter configuration information to reduce cross-interference of the RF sensing signals (e.g., parameters such as frequency ranges, timing, guard bands, beam width, pre-defined transmission sequences, etc.). In an example, the RF sensing operations may utilize OFDM techniques and the RF sensing assistance data messages 858 may include resource part information (e.g., timing and frequency) for the RF sensing operations. In an example, the assistance data may include RF signature and/or attribute information associated with expected target objects. The information may include an expected location (e.g., range/bearing), an expected movement (e.g., velocity/direction), size, and/or other frequency domain characteristics to assist the UEs 852 in identifying a target object (e.g. as described for FIG. 8B). Other information elements may also be included in the assistance data.

At stage 860, the UEs 852 may perform RF sensing operations based at least in part on the assistance data. For example, the UEs 802, 804, 806, 808 may be configured to jointly perform monostatic RF sensing operations based on assigned geographic areas (e.g., the areas 802*a*, 804*a*, 806*a*, 808*a*), time division, frequency division, and/or combinations of area, time and frequency. In an example, the UEs 802, 804, 806, 808 may be configured for bistatic RF sensing such that the RF signals transmitted by one UE that are reflected, scattered, diffracted, and/or absorbed by target objects may be received and utilized by other UEs to detect the target objects.

The UEs 852 may be configured to provide RF sensing report messages 862 to the LMF 120 based on the RF sensing operations at stage 860. In an example, each of the UEs 852 may be configured to respectively determine attributes associated with target objects such as size, motion, range, bearing (e.g., boresight direction), elevation (e.g., in 3D implementations), or other attributes based on the received RF signals. The RF sensing report messages 862 may include the attribute information. In an example, the UEs 852 may provide raw RF signal information in the RF sensing report messages 862, and a network server such as the LMF 120, or other server 400, may be configured to determine the attributes based on the RF signal information. A crowdsourcing server may be configured to analyze and aggregate the content of the RF sensing report messages 862 across multiple UEs 852 at stage 864 and to provide crowd sensing information back to the UEs 852 or provide crowd sensing information to another entity such as the external client or server 130.

The crowdsourcing server may determine one or more environmental characteristics at stage 864 based at least in part on the analyzing and aggregating of the RF sensing report messages 862. The one or more environmental characteristics (e.g., inferences) may comprise a least one of: tracking a movement or a location or both of a person, a vehicle, an animal, a drone or an other object; determining one or more attributes of the person, the vehicle, the animal, the drone or the other object; and determining one or more attributes of a crowd of people, a plurality of vehicles, a group of animals, a group of drones or a set of other objects. The one or more attributes of the person, the vehicle, the animal, the drone or the other object may include a horizontal location, an altitude, a speed, a bearing, a size, a height, a width, a length, a weight, a type, a make, a model, a species, an orientation, a pose, a gait, a type of clothing, a carrying of a bag or package, or some combination of these. The one or more attributes of the crowd of people, the plurality of vehicles, the group of animals, the group of drones or the set of other objects may include a location, a location area, a density, a number, a rate of numeric increase, a rate of numeric decrease, an average speed, a statistical direction of motion, or some combination of these. The crowdsourcing server may include information in the RF sensing assistance data messages 858 related to at least one of the movement, the location or the one or more attributes of the person, the vehicle, the animal, the drone or the other object. The crowdsourcing server may also or instead include information in the RF sensing assistance data messages 858 related to at least one of the one or more attributes of the crowd of people, the plurality of vehicles, the group of animals, the group of drones or the set of other objects.

While the messages in the message flow 850 may utilize LPP as described, other messaging and control techniques may be used. For example, RF sensing assistance data and reports may utilize Radio Resource Control (RRC) techniques or may employ messages (e.g. HTTP messages) transferred over a user plane (e.g. using TCP/IP protocols). Other techniques, such as Medium Access Control (MAC) Control Elements (CE) may be used to trigger RF sensing operations. For example, the gNB 110*a* may be configured to provide a MAC-CE message to activate RF sensing in a UE, and the UE may be configured to provide RF sensing reports in response to receiving the MAC-CE message. Other signaling techniques may also be used.

Figure 9:
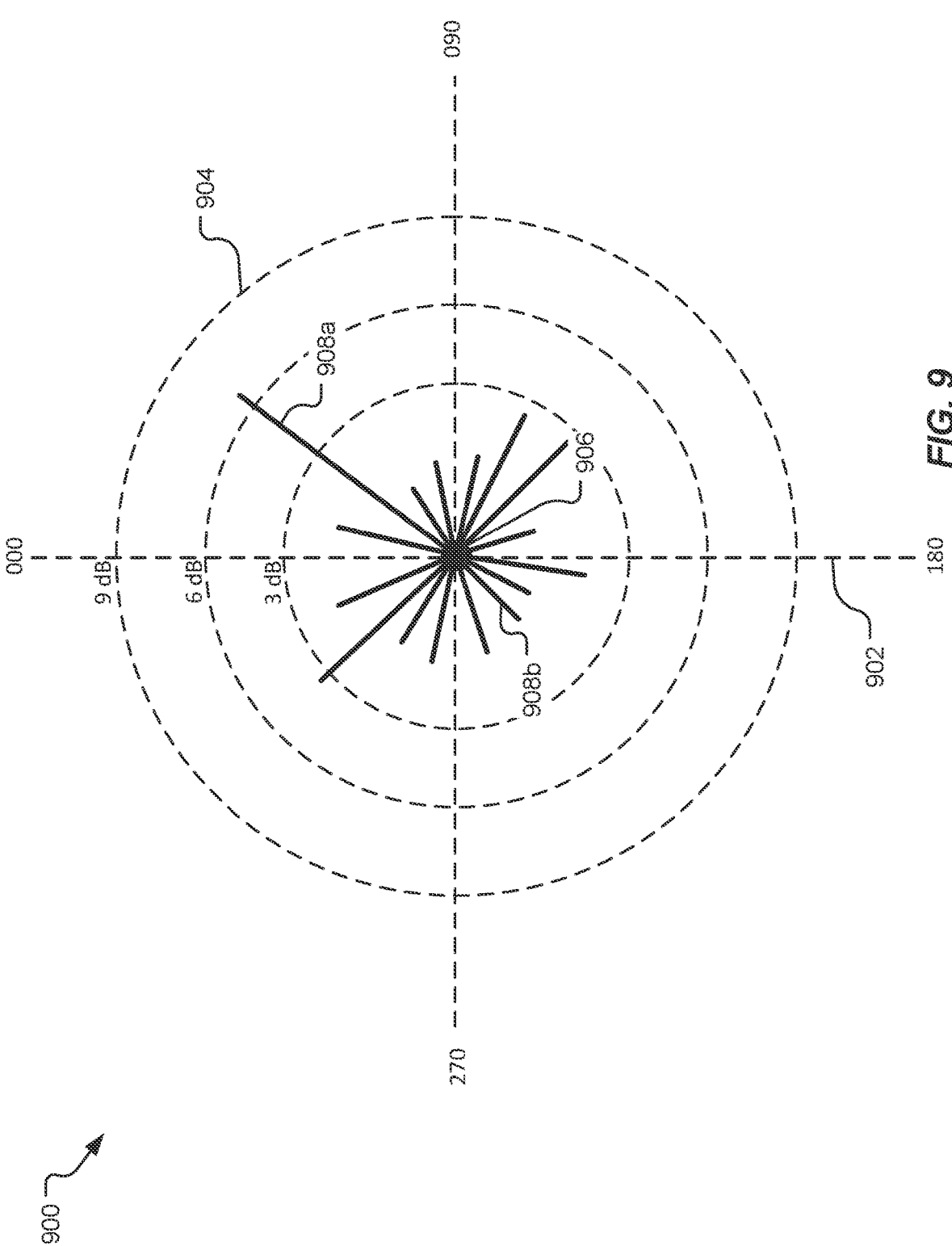
FIG. 9 is an example directional plot including boresight directions to objects detected with radio frequency sensing.

Referring to FIG. 9, an example directional plot 900 including boresight directions to objects detected with radio frequency sensing is shown. The plot 900 is an example of RF sensing information which may be determined by a UE (e.g. a UE 852) and included in the RF sensing report messages 862 and utilized by an RF sensing crowdsourcing server (e.g. LMF 120 or server 400) to aggregate RF sensing information. In an example, the RF sensing information may include an array of boresight angle and gain information such as depicted in the plot 900. The plot 900 includes a coordinate plane 902 (e.g., polar angles from 0 to 360 degrees which may be related to or aligned with a global coordinate plane such as one with a North-South or East-West polar axis) and signal gain values 904, such that the relative strength of a received RF signal (e.g., the gain of the reflected signal 512*b*) may be plotted from a center position 906. A set of measurements extending at various angles from the center position 906 indicate the strength of the RF signals received at the respective boresight angle. For example, a first measurement 908*a* has a relatively higher gain (e.g., signal strength) than the surrounding measurements and may indicate that an object is located at that boresight angle. The gain value (e.g., length of the measurement) may also be used to indicate the size of the object. In contrast, a second measurement 908*b* has a relatively smaller gain (e.g., at the noise level) and thus may indicate the absence of a target object. The boresight angles and gain values are examples, and may vary based on the capabilities of the UE. In an example, the angular resolution may be in the range of 2 to 5 degrees.

Figure 10:
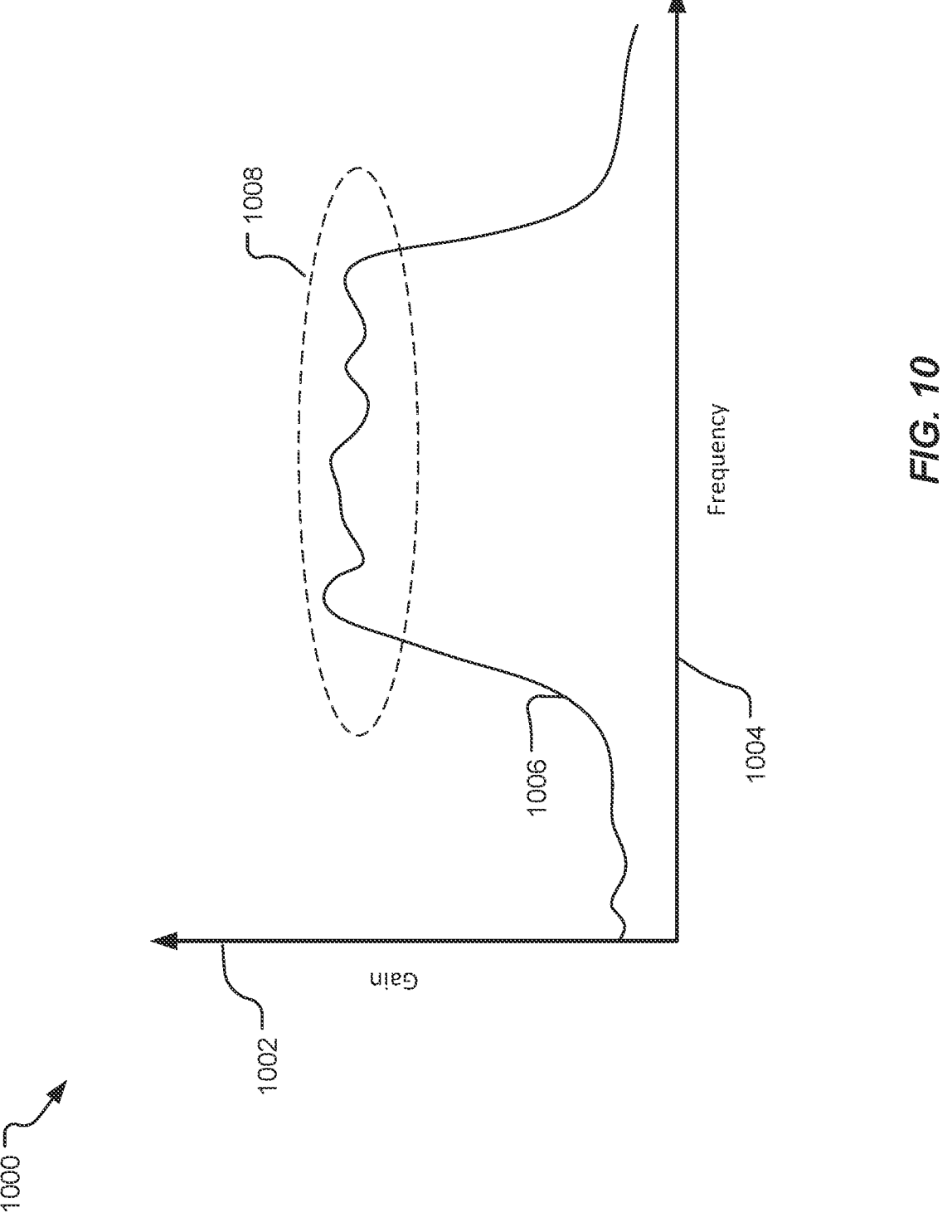
FIG. 10 is a graph of example frequency based components in radio frequency signal information.

Referring to FIG. 10, a graph 1000 of example frequency based components in radio frequency signal information is shown. The graph 1000 represents a generalized frequency domain analysis of a reflected RF signal. In general, a RF signal may be represented as an array of variables, and may be plotted in the frequency domain with a gain axis 1002 and a frequency axis 1004. A frequency response 1006 may include an array of frequency and gain values which may be used to characterize a target. For example, a target signal area 1008 may be based on an RF pulse and used to distinguish and/or identify a particular target. The signal area 1008 is an example of signal information (e.g., frequency based components) which may be included in one or more RF sensing report messages 862 and used by a crowdsourcing server to identify a target. In operation, the frequency response 1006 may represent other spectral functions such as doppler frequency or other spectral processing such as power spectral density (PSD). In an example, machine learning applications may be trained with frequency responses and used to characterize the signal area 1008. The frequency response 1006 may apply to a particular boresight direction in a directional plot, such as directional plot 900, and thus each of the measurements in a directional plot (e.g. measurements 908*a*, 908*b* in FIG. 9)

may have its own unique frequency response, such as frequency response 1006 shown in graph 1000.

Figure 11:
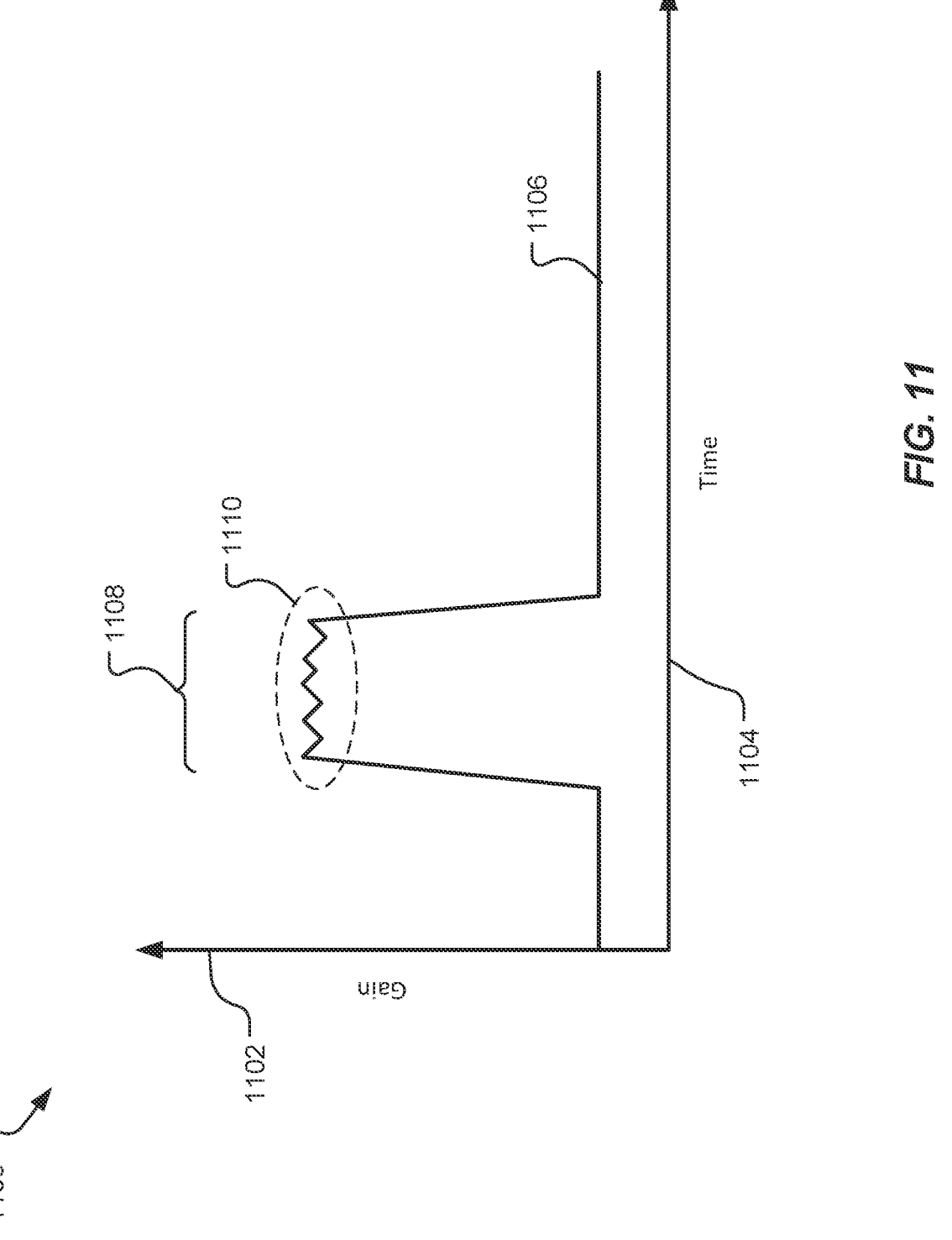
FIG. 11 is a graph of example time based components in radio frequency signal information.

Referring to FIG. 11, a graph 1100 of example time based components of radio frequency signal information are shown. The graph 1100 represents a generalized time domain analysis of a reflected RF signal. In general, a RF signal may be represented as an array of variables, and may be plotted in the time domain with a gain axis 1102 and a time axis 1104. A time response 1106 may include an array of time and gain values which may be used to characterize a target. For example, a target signal area 1110 may be based on an RF pulse 1108 and used to distinguish and/or identify a particular target. The signal area 1110 is an example of signal information (e.g., time based components) which may be included in one or more RF sensing report messages 862 and used by a crowdsourcing server to identify a target. In operation, the time response 1106 may represent other time domain functions such as scattering features, pulse profiling, and time-frequency signatures. In an example, machine learning applications may be trained with time domain responses and used to characterize the signal area 1110. The time response 1106 may apply to a particular boresight direction in a directional plot, such as directional plot 900, and/or to a particular frequency response, such as frequency response 1006 shown in graph 1000.

Figure 12:
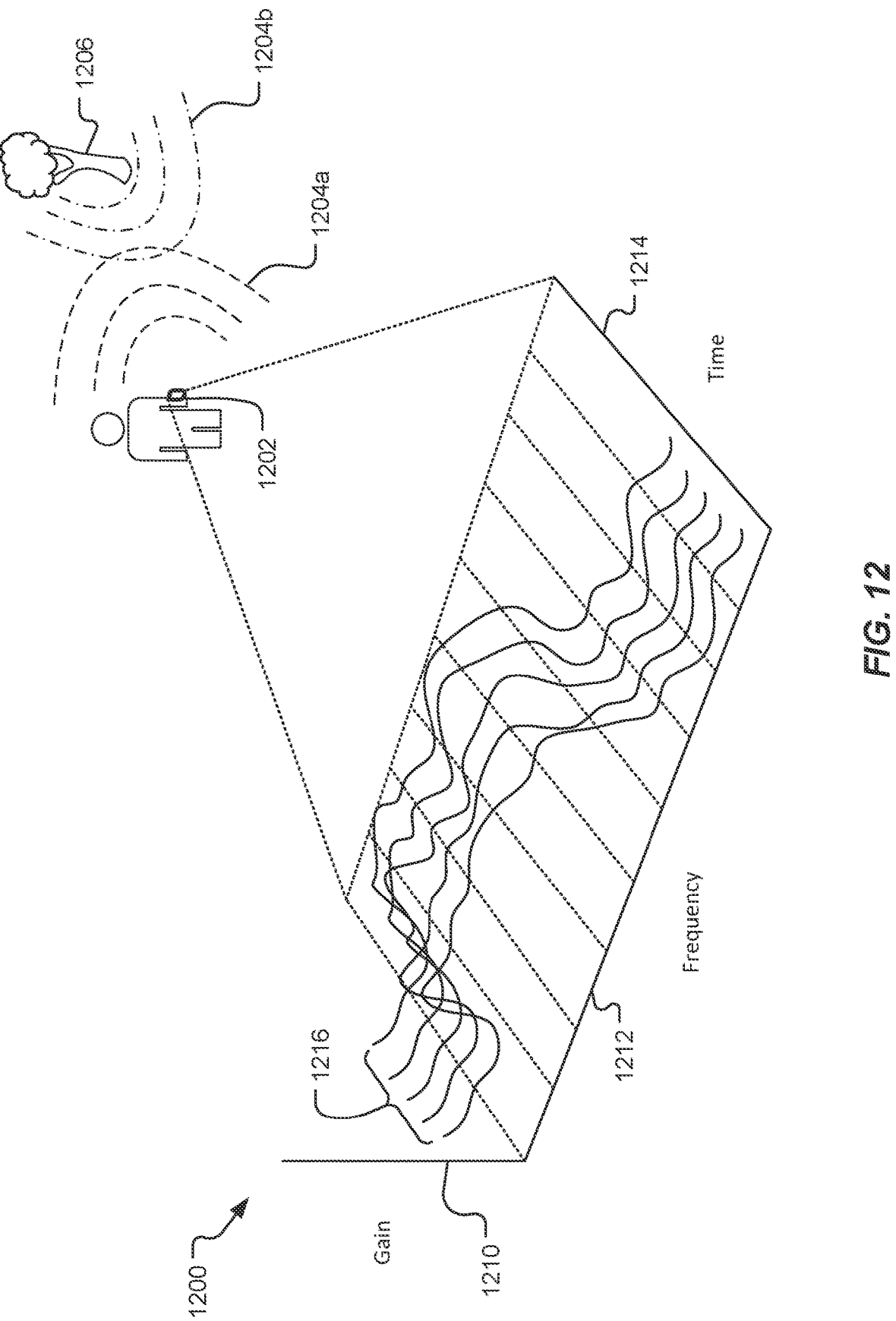
FIG. 12 is a graph of an example time and frequency response of a radio frequency sensing signal.

Referring to FIG. 12, an example time and frequency response graph 1200 of a radio frequency sensing signal is shown. The graph 1200 represents a generalized time and frequency response of a reflected RF signal. In an example, a UE 1202 may be configured to perform RF sensing operations including transmitting RF signals 1204a and receiving reflected RF signals 1204b based on a proximate object 1206. The UE 1202 may be configured to determine the time and frequency response of the reflected signals 1204b as a multi-variable array, such as the response functions 1216. The multi-variable array may include gain, frequency and time parameters, which may be plotted on a gain axis 1210, a frequency axis 1212, and a time axis 1214 as depicted in FIG. 12. The multi-variable array (e.g., the response functions 1216) is an example of signal information which may be included in one or more RF sensing report messages 862 and used by a crowdsourcing server to identify a target. In operation, machine learning applications may be trained with the response functions 1216 for associated targets and used to characterize the reflected signals 1204b. The multi-variable response functions 1216 may apply to a particular boresight direction in a directional plot, such as directional plot 900, in which case a multi-variable array in four dimensions may be plotted to include gain, frequency, time and boresight direction parameters. The information in such a four dimensional plot may be an example of signal information which may be included in one or more RF sensing report messages 862 and used by a crowdsourcing server to identify a target or set of targets.

Figure 13:
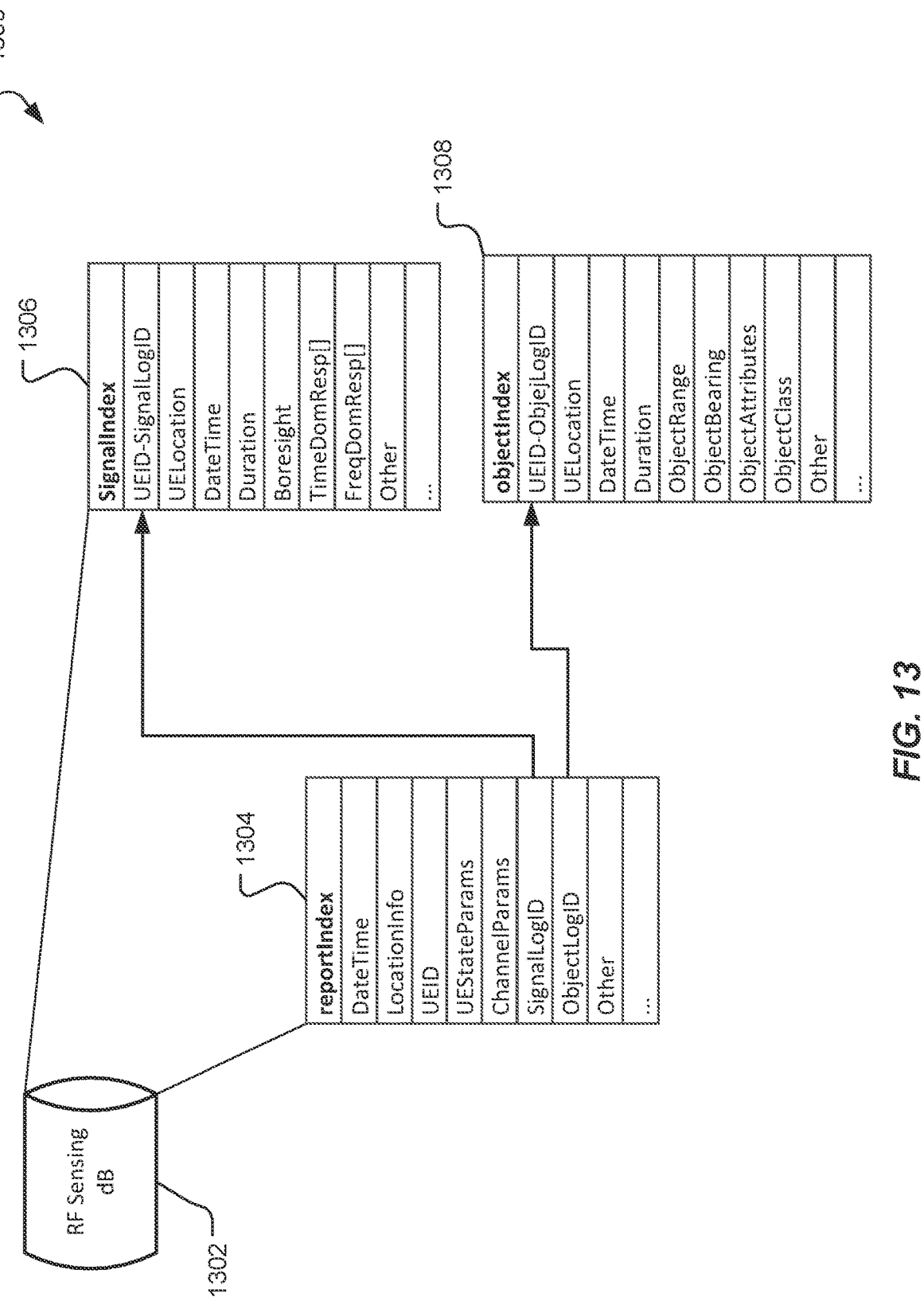
FIG. 13 is an example data structure for crowdsourcing radio frequency sensing reports.

Referring to FIG. 13, an example data structure 1300 for crowdsourcing radio frequency sensing signal information is shown. The data structure 1300 may be stored in (e.g. may persist on) an external client or server 130, such as a crowdsourcing server, or on another networked server 400 such as the LMF 120. In an embodiment, the data structure 1300 may be stored in (e.g. may persist on) a UE 200. The data structure 1300 may be disposed on a memory device 1302 such as a solid state or mechanical hard drive, and may include a plurality of data records stored in a relational database application (e.g., Amazon Aurora, Oracle Database, Microsoft SQL Server, MySQL, DB2, etc.), or stored in one or more flat files (e.g., JSON, XML, CSV, etc.). The table structures and fields in the data structure 1300 are examples, and not limitations, as other data fields, tables, stored procedures and indexing schemas may be used to construct the data structure 1300. In an example, a report table 1304 may be configured to capture parameters associated with an instance of RF sensing operations. One or more datetime fields (e.g., start/stop times, duration, etc.) may be used to record when the RF sensing operations occurred, and location info fields may indicate where the RF sensing operations occurred (e.g., latitude/longitude/altitude, grid coordinates, etc.). A UEID field may uniquely identify the wireless node obtaining the RF sensing measurements (e.g. using a global identity of the wireless node or some other unique identity assigned to or by the wireless node that hides the global identity and provides privacy to the wireless node). One or more UEstateparams fields may capture the UE state information during the RF sensing operations. For example, the state information may include orientation and inertial measurement values (e.g., based on the IMU 270), user presence detection, battery charge, software status/version, and other UE specific parameters used to characterize the state of the wireless node during RF sensing operations. ChannelParams fields may be used to capture channel information such as the channel state (e.g., CIR, CFR, CSI) and channel gain (e.g., SNR) during the RF sensing operations.

The records in the report table 1304 may be related to other tables such as a signals table 1306 and an objects table 1308. The signals table 1306 may include fields associated with the RF sensing signals measured by the wireless node. In an example, the fields may include time, date and location information associated with signal measurements (e.g., based on the wireless node's location during the RF sensing operations). The signal information may include one or more boresight fields indicating an angle of arrival (AoA) and corresponding signal strength of an RF signal. For example, the boresight fields may be based on the information depicted in the plot 900. Parameters associated with time and frequency domain measurements may also be stored in arrays associated with the signals table 1306. For example, frequency domain arrays may include the frequency components described in FIG. 10, and time domain arrays may include the time components described in FIG. 11. Other fields and data structures may be used to store other signal parameters such as the time and frequency response information described in FIG. 12, as well as other signal identification parameters (e.g. as applicable to radar) and as known in the art.

The objects table 1308 may include parameters associated with target objects detected by the wireless nodes and reported to the crowdsourcing server. In an example, the fields may include time, date and location information associated with signal measurements (e.g., based on the wireless node's location during the RF sensing operations). Object range and bearing information, as determined by the wireless node, may be included in one or more fields in the objects table 1308. Other attribute fields may be included to record wireless node determined attributes for a target object such as size, pose/orientation, velocity, and direction of motion. Other fields may be used for additional attributes. One or more classification fields may be used to store classification information provided by the reporting wireless node. For example, the reporting wireless node may be configured to classify a target object based on transmitted and received RF signals. The classifications may be based on local processing of the RF signals to provide a general description of the target (e.g., human, dog, car, truck, tree, wall, building, etc.). In an example, the wireless node may be configured to use other sensors (e.g., camera, microphone, light detection and ranging, ultrasound, etc.) to classify a target object and provide the classification with the RF sensing reports. In an example, the wireless node may be configured to include the sensor information (e.g., image, audio recording) with the RF sensing report messages (e.g. RF sensing report messages 862). Similar fields and data structures may be used to store object based parameters to enable a crowdsourcing server to store and aggregate the results of RF sensing operations obtained by multiple wireless nodes.

Figure 14A:
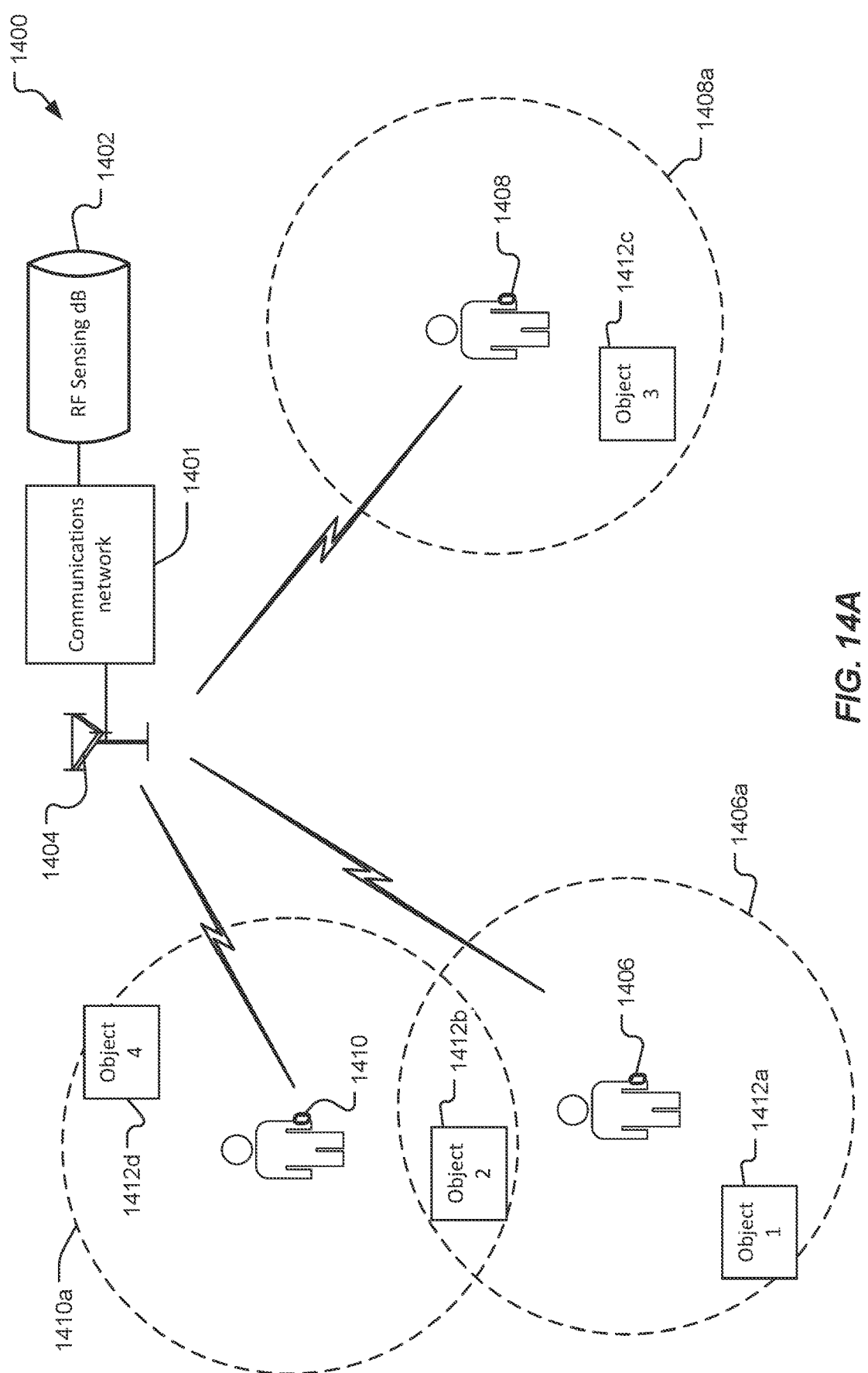
FIGS. 14A and 14B are diagrams of a composite map based on multiple radio frequency sensing reports.
Figure 14B:
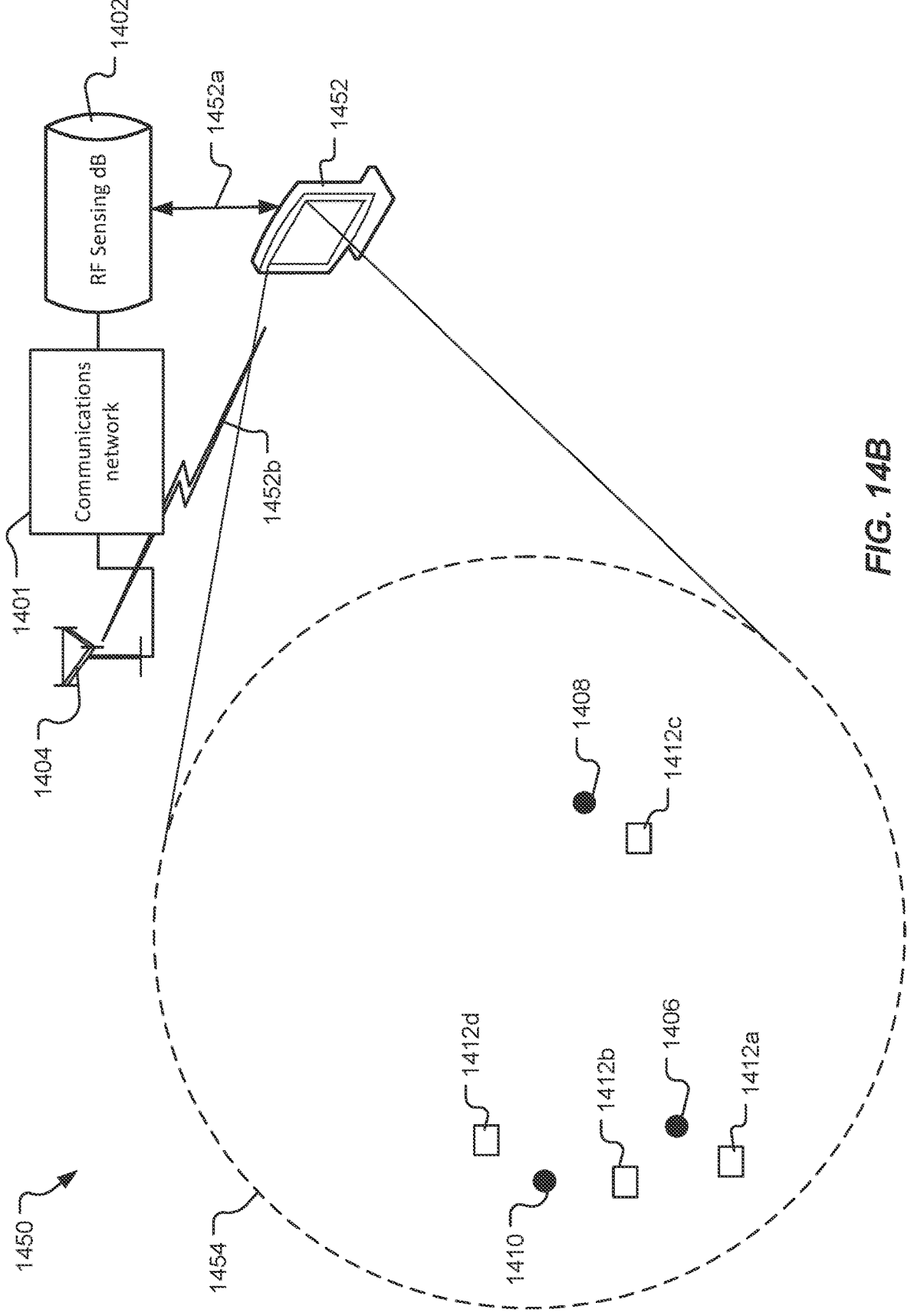

Referring to FIGS. 14A and 14B, diagrams of a composite map based on multiple radio frequency sensing reports are shown. A first diagram 1400 includes an RF sensing data structure 1402 which is operably coupled to a communication network 1401 including a base station 1404. The communication network 1401 is an example of the communication system 100, and the RF sensing data structure 1402 may be included in a crowdsourcing server, such as an external client or server 130, the LMF 120, or another server 400. The RF sensing data structure 1402 may include the tables described in FIG. 13, e.g. may include the tables for each of a plurality of wireless nodes (e.g. UEs 105 and 106) that provide RF sensing report messages (e.g. RF sensing report messages 862) to the crowdsourcing server. The base station 1404 may include the components of the TRP 300, and the TRP 300 may be an example of the base station 1404. While one base station is depicted in FIGS. 14A and 14B, additional base stations may be used to send and receive RF sensing information to UEs within the communication network 1401. The communication network 1401 may utilize the message flow 850 to send and receive RF sensing information to multiple wireless nodes (e.g. UEs such as UEs 105 and 106) in the network. For example, a first UE 1406 may be configured to obtain RF sensing measurements within a first area 1406a, a second UE 1408 may be configured to obtain RF sensing measurements within a second area 1408a, and a third UE 1410 may be configured to obtain RF sensing measurements within a third area 1410a. The first UE 1408 may detect a first object 1412a and a second object 1412b and provide one or more RF sensing measurement report messages to be stored in the RF sensing data structure 1402. The second UE 1408 may detect a third object 1412c, and the third UE 1410 may detect the second object 1412b and a fourth object 1412d. The second and third UEs 1408, 1410 may also provide respective RF sensing report messages to the crowdsourcing server. The RF sensing report messages may include boresight angle, time, frequency and/or gain components, such as described in FIGS. 9-12, and/or object information such as described in FIGS. 6-8A. For example, the RF sensing report messages may include a current location of each of the respective UEs and the ranges and bearings to the detected objects. The server 400 may be configured to store the RF sensing information in the RF sensing report messages in one or more tables in the RF sensing data structure 1402.

Referring to FIG. 14B, a second diagram 1450 illustrates a composite map 1454 based on the RF sensing reports provided by the UEs 1406, 1408, 1410. In an example, a server 400 within the communication network 1401 or an external server 1452 may access the RF sensing data structure 1402 to compute the composite map 1454 and determine one or more environmental characteristics based on the RF signals and/or attributes associated with each of the target objects. In an example, the external server 1452 may have access to the RF sensing data structure 1402 via a wired connection 1452a or via a wireless connection 1452b. The environmental characteristics may be based on locations of the objects, a density of the objects, a motion of the objects, or other attributes of the individual objects when viewed as a group. For example, in a crowd sensing use case, the objects 1412a-d may be associated with people moving around in a building, or other pedestrian area, and environmental characteristics may be based on the density of the objects 1412a, 1412b, 1412d proximate to the first and third users 1406, 1408. The crowd density may infer higher pedestrian traffic (e.g., if the objects are moving), or preferred locations for viewing an event, or any other inference associated with an increasing (or decreasing) crowd size. In an example, the external server 1452 may be configured to track an object over a period of time. For example, the proximate location of an object (e.g., based on range and bearing from a UE) and the motion of the object (e.g., based on multiple measurements from the UE) may be used to identify and track the object through different coverage areas. In an example, the server 400 may be configured to provide RF sensing assistance data with an estimated position of an object to enable a UE to acquire and track the object.

Referring to FIG. 15, with further reference to FIGS. 1-14A, a method 1500 for determining object attributes with radio frequency sensing includes the stages shown. The method 1500 is, however, an example and not limiting. The method 1500 may be altered, e.g., by having stages added, removed, rearranged, combined, performed concurrently, and/or having single stages split into multiple stages. The method 1500 may be performed by a server (e.g. an LMF 120, a server 400 or an external client or server 130), by a network node (e.g. an AMF 115) or by a wireless device (e.g. a UE 105).

At stage 1502, the method includes receiving radio frequency sensing signal information. A server 400, including a processor 410 and a transceiver 415, is a means for receiving the RF sensing signal information. In an example, one or more wireless nodes (also referred to herein as one or more wireless devices), such as the UEs 852 in FIG. 8C may provide RF sensing report messages 862 including the RF sensing signal information to the server 40. In an example, the RF sensing signal information may include one or more boresight fields indicating the angle of arrival (AoA) and corresponding signal strength of an RF signal, such as depicted in the plot 900. The RF sensing signal information may include other parametric values associated with time and frequency and/or time domain measurements which may be stored in arrays associated with the signals table 1306. The RF sensing signal information may include other values and/or data structures such as the time and frequency response information described in FIG. 12, as well as other parametric values associated with radar signal identification techniques as known in the art. The RF sensing signal information may also include state information based on the configuration of the wireless node and the RF sensing operations. For example, the RF sensing signal information may include identification, time, date and/or location information associated with the wireless node performing the RF sensing operations.

At stage 1504, the method includes detecting one or more time based components and one or more frequency based components in the radio frequency sensing signal information. The server 400, including the processor 410, is a means for detecting the one or more time based components and one or more frequency based components in the RF sensing signal information. In an example, the time based components may include the delay time associated with a transmitted RF signal and the detected reflected signal. The time based components may also include the AoA and gain information associated with reflected RF signals (e.g., as depicted in FIG. 9). The one or more frequency components may include doppler shifts in the reflected RF signal. Other time and/or frequency components such as depicted in FIGS. 10-12 may be included in the RF sensing signal information, and the server 400 may be configured to store the time and frequency components in the signals table 1306. Other data structures may also be used.

At stage 1506, the method includes determining a range to an object based at least in part on the one or more time based components. The server 400, including the processor 410, is a means for determining the range. In an example, referring to FIGS. 5A and 5B, the time difference between the first peak 558 (i.e., the time of transmission) and the second peak 560 (i.e., the reflected signal 512b) may be utilized to estimate the distance to the object. The AoA of the reflected signal 512b may also be obtained based on the ADC capture from multiple antennas (e.g., additional receive chains 520, 522).

At stage 1508, the method includes determining one or more attributes of the object based at least in part on the one or more time based components or the one or more frequency based components. The server 400, including the processor 410, is a means for determining the one or more attributes. In general, the time and frequency based components include the parameters described in FIGS. 9-12 and stored in the data structure 1300. In an example, the server 400 may be configured to determine the velocity, direction, and/or size of the object. The velocity of an target object may be obtained based on indications of doppler shifts in the RF sensing signal information. Angular direction may be based on different AoD and AoA information in the RF sensing signal information. Other techniques, such as signature analysis and inverse scattering techniques as known in the art may be used to detect other attributes of the object. For example, the size of a target object may be based on the magnitude of a received signal and the presence of moving parts on a target object may be based on detecting different doppler shifts across the time and frequency components. The server 400 may be configured to perform other spectral functions such as doppler frequency or PSD processing. In an example, machine learning algorithms may be used to determine one or more attributes of the object. For example, supervised learning methods may utilize training data such as time and frequency responses (e.g., response functions 1216) for known objects to establish a relationship between the inputs and the corresponding outputs. For example, the supervised learning methods may be used to determine attributes of an object based on a response function obtained during RF sensing operations. Unsupervised learning techniques, such as clustering, dimensionality reduction, anomaly detection, and association mining may also be used to classify response functions 1216 and determine attributes of a detected object.

Referring to FIG. 16, with further reference to FIGS. 1-15, a method 1600 for crowdsourcing radio frequency sensing data includes the stages shown. The method 1600 is, however, an example and not limiting. The method 1600 may be altered, e.g., by having stages added, removed, rearranged, combined, performed concurrently, and/or having single stages split into multiple stages. The method 1600 may be performed by a wireless device such as a UE 105, UE 106, UE 200 or TRP 300.

At stage 1602, the method includes receiving radio frequency sensing assistance data from a server. A wireless node such as the UE 200, including a general-purpose processor 230 and a transceiver 215, is a means for receiving RF sensing assistance data. The server may be an external client or server 130, the LMF 120, the server 400 or another edge server configured to communicate with one or more wireless nodes in a network. In an example, the server may be configured to provide RF sensing assistance data messages 858 to one or more wireless nodes, such as any of the UEs 852.

At stage 1604, the method includes performing radio frequency sensing operations based at least in part on the radio frequency sensing assistance data. The UE 200, including the general-purpose processor 230 and the transceiver 215, is a means for performing RF sensing operations. In an example, the wireless device receiving the RF sensing assistance data at stage 1602 may configure transmitter and/or receiver settings based on the RF sensing assistance data. The server may configure the wireless device to perform monostatic RF sensing operations based on assigned geographic areas, time division, frequency division, and/or combinations of area, time and frequency. Other information elements in the RF sensing data may also be used to configure RF sensing operations. In an example, the wireless device may be configured for bistatic RF sensing such that RF signals transmitted by another nearby wireless device may be received by the wireless device to detect one or more target objects. The radio frequency sensing operation may include transmitting one or more radio frequency (RF) signals (e.g. RF signals for IEEE 802.11 WiFi or 5G NR). The radio frequency sensing operations may include detecting one or more stationary objects. The radio frequency sensing assistance data may include location information associated with the one or more stationary objects. In a crowd sensing use case, referring to FIG. 8A, target objects may include people (e.g., a crowd) as well as the stationary objects. In an example, the RF sensing assistance data may include position and/or signal information associated with the stationary objects (e.g., lamp posts, street signs, etc.) to enable the wireless device to detect the stationary objects and establish a coordinate reference.

The RF sensing assistance data may include RF sensing configuration information to enable the wireless device to perform the RF sensing operations. For example, RF sensing assistance data may include geographic information, e.g. to define where the wireless device is located and/or where a target of the RF sensing is located, and the wireless device may perform the radio frequency sensing operations based at least in part on the geographic information. The RF sensing assistance data may include transmitter configuration information. e.g. to reduce cross-interference of the RF sensing signals, and the wireless device may perform the radio frequency sensing operations based at least in part on the transmitter configuration information. The RF sensing assistance data may include timing information, e.g. to enable time division multiplexing (TDM) of the RF sensing operations with multiple other wireless devices, and the wireless device may perform the radio frequency sensing operations based at least in part on the timing information. The RF sensing operations may utilize OFDM, UWB. LTF. L-LTF, and/or HT techniques and the RF sensing assistance data may include orthogonal frequency division multiplexing configuration information such as communication packet preamble information, and the wireless device may perform the radio frequency sensing operations based at least in part on the orthogonal frequency division multiplexing configuration information. In an example, the RF sensing assistance data may include RF signature and/or attribute information associated with one or more potential targets, and the wireless device may perform the radio frequency sensing operations based at least in part on the RF signature or attribute information. The attribute information may include expected locations (e.g., ranges/bearings), movement (e.g., velocities/directions), sizes, and/or other frequency domain characteristics to assist in identifying and tracking target objects.

At stage 1606, the method includes reporting radio frequency sensing results to the server. The UE 200, including the general-purpose processor 230 and the transceiver 215, is a means for reporting the RF sensing results. In an example, the wireless device may be configured to provide data such as the RF sensing report messages 862 based on the RF sensing operations at stage 1604. In an example, the wireless device may be configured to determine attributes associated with one or more target objects based on the radio frequency sensing operations. The attributes may include size, motion, range, bearing (e.g., boresight direction), elevation (e.g., in 3D implementations), velocity, direction of motion or combinations thereof based on received RF signals. The RF sensing results include data such as the attribute information. Reporting the radio frequency sensing results may include reporting the one or more attributes associated with the one or more target objects. In an example, reporting the radio frequency sensing results may include reporting RF signal information based on the RF sensing operations such as time based components, frequency based components or both. The server may be configured to determine additional attributes based on the RF signal information. In an example, the server may be configured to aggregate RF sensing results received from multiple wireless devices (including the wireless device) to compute a composite map and/or determine the additional attributes and/or one or more environmental characteristics, e.g. as described for stage 864 for FIG. 8C. In an example, the RF sensing results may also include sensor data obtained from other sensors on the wireless device such as images from visible light based cameras and/or infrared cameras, light detection and ranging, or other sensor information based on the capabilities of the wireless device. In an embodiment, the method 1600 may iterate back to stage 1602 and the wireless device may receive additional assistance data from the server. The server may be configured to update the additional assistance data based on the radio frequency results, thus the wireless device may receive updated signal and object tracking information with each iteration of the assistance data.

In one embodiment, the server may receive a plurality of radio frequency sensing results from a plurality of wireless devices including the wireless device. The server may then aggregate the plurality of radio frequency sensing results, and determine one or more environmental characteristics based on aggregating the plurality of radio frequency sensing results, e.g. as described for stage 864 for FIG. 8C and for FIGS. 7A, 7B, 9 and 13. The one or more environmental characteristics may comprise a least one of: tracking a movement or a location or both of a person, a vehicle, an animal, a drone or an other object; determining one or more attributes of the person, the vehicle, the animal, the drone or the other object; and determining one or more attributes of a crowd of people, a plurality of vehicles, a group of animals, a group of drones or a set of other objects. The one or more attributes of the person, the vehicle, the animal, the drone or the other object may include a horizontal location, an altitude, a speed, a bearing, a size, a height, a width, a length, a weight, a type, a make, a model, a species, an orientation, a pose, a gait, a type of clothing, a carrying of a bag or package, or some combination of these. The one or more attributes of the crowd of people, the plurality of vehicles, the group of animals, the group of drones or the set of other objects may include a location, a location area, a density, a number, a rate of numeric increase, a rate of numeric decrease, an average speed, a statistical direction of motion, or some combination of these. The radio frequency sensing assistance data may include information related to at least one of the movement, the location or the one or more attributes of the person, the vehicle, the animal, the drone or the other object. The radio frequency sensing assistance data may include information related to at least one of the one or more attributes of the crowd of people, the plurality of vehicles, the group of animals, the group of drones or the set of other objects.

In one embodiment, the radio frequency sensing assistance data is received via one or more LTE Positioning Protocol (LPP) messages, one or more Radio Resource Control (RRC) messages or one or more IP messages or TCP/IP messages. In one embodiment, the radio frequency sensing results are reported to the server in one or more LTE Positioning Protocol (LPP) messages, one or more Radio Resource Control (RRC) messages or one or more IP messages or TCP/IP messages.

Figure 17:
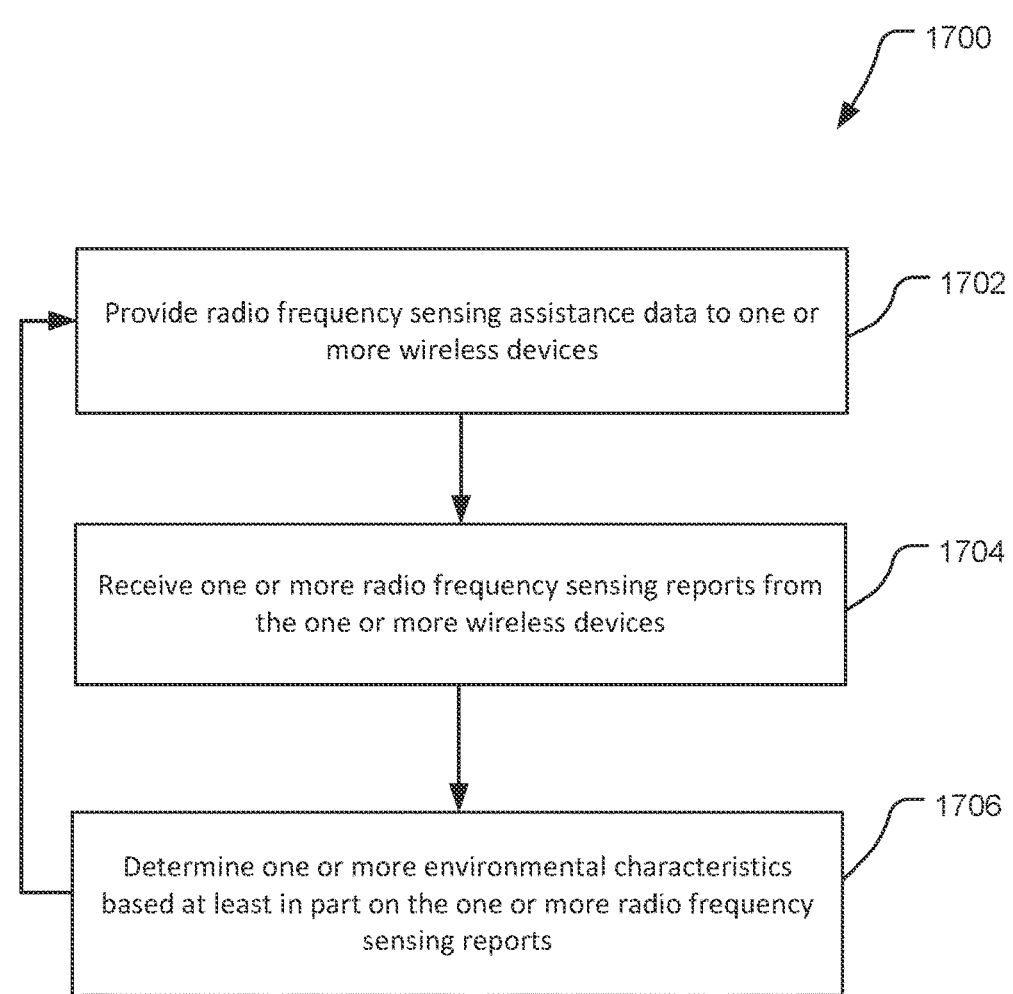
FIG. 17 is an example process flow of a method of environment detection at server using radio frequency sensing.

Referring to FIG. 17, with further reference to FIGS. 1-15, a method 1700 of environment detection at server using radio frequency sensing includes the stage shown. In an example, RF sensing may be performed with multiple wireless devices (e.g. UEs 105, 106, 200 and/or TRPs 300). The method 1700 is, however, an example and not limiting. The method 1700 may be altered, e.g., by having stages added, removed, rearranged, combined, performed concurrently, and/or having single stages split into multiple stages. The method 1700 may be performed by a server such as an LMF 120, a server 400 or an external client or server 130.

At stage 1702, the method includes providing radio frequency sensing assistance data to one or more wireless devices. A server 400, including a processor 410 and a transceiver 415, is a means for providing the RF sensing assistance data. In an example, the server 400 may be configured to provide RF sensing assistance data messages 858 to multiple wireless devices, such as the UEs 852. The RF sensing assistance data may include RF sensing configuration information to enable the wireless devices to jointly perform RF sensing operations. For example, RF sensing assistance data may include geographic information such as sector information to define where a wireless device will perform RF sensing, as well as transmitter configuration information such as beam configuration information to reduce cross-interference of the RF sensing signals. The RF sensing operations may utilize OFDM, UWB, LTF, L-LTF, and HT techniques and the RF sensing assistance data may include orthogonal frequency division multiplexing configuration information such as communication packet preamble information. In an example, the RF sensing assistance data may include timing information, RF signature information and/or attribute information associated with a potential target object to assist in performing radio frequency sensing operations (e.g. of the potential target object) by the wireless device. The attribute information may include expected locations (e.g., ranges/bearings), movement (e.g., velocities/directions), sizes, and/or other frequency domain characteristics to assist in identifying and tracking the potential target object. The RF sensing assistance data may include information associated with stationary objects with known locations that are proximate to the location of the wireless device. Other information elements may also be included in the RF sensing assistance data. The radio frequency sensing assistance data may be provided at stage 1702 via one or more LTE Positioning Protocol (LPP) messages, one or more Radio Resource Control (RRC) messages, or one or more IP or TCP/IP messages.

At stage 1704, the method includes receiving one or more radio frequency sensing reports from the one or more wireless devices. For example, the server may provide an indication to each of the multiple wireless devices (e.g. as part of the radio frequency sensing assistance data) to perform radio frequency sensing operations, after which the multiple wireless devices may send the radio frequency sensing reports back to the server. The server 400, including the processor 410 and the transceiver 415, is a means for receiving the RF sensing reports. The multiple wireless devices may be configured to provide RF sensing report messages 862 based on performing RF sensing operations. In an example, the multiple wireless devices may be configured to determine attributes associated with target objects such as size, direction of motion, range, bearing (e.g., boresight direction), elevation (e.g., in 3D implementations), velocity or combinations thereof based on the received RF signals. The RF sensing reports may include the attributes, such as one or more attributes associated with an object. In an example, the multiple wireless devices may provide RF signal information, such as time based components and frequency based components, in the RF sensing reports, and the server 400 may be configured to determine additional attributes based on the RF signal information. The radio frequency sensing reports may include sensor data obtained by the multiple wireless devices, where the sensor data may include an image from a visual light based camera or an infrared camera. The information in the RF sensing reports may be stored by the server in one or more data structures, such as the data structure 1300.

At stage 1706, the method includes determining one or more environmental characteristics based at least in part on the one or more radio frequency sensing reports, e.g. as described for stage 864 for FIG. 8C. The server 400, including the processor 410, is a means for determining one or more environment characteristics. The environmental characteristics may include or be based on a density of objects in a composite result, a motion direction of the objects in the composite result, or one or more other attributes of objects in the composite result. For example, characteristics may be obtained regarding crowd size, crowd movement, traffic flow or a building egress (e.g. construct an evacuation plan for a building on fire) based on composite results. Referring to FIG. 14B, environmental characteristics may be based on the density of the objects 1412a, 1412b, 1412d proximate to the first and third users 1406, 1408. The crowd density may infer higher pedestrian traffic (e.g., if the objects are moving), or a crowd size for an event, traffic flow based on the movement of the objects 1412a, 1412b, 1412d. Other environmental characteristics such as the number of adults (e.g., large humans) and the number of children (e.g., smaller humans) in a crowd may be inferred based on the RF signals. Other environmental characteristics may also be determined based on object classification results.

In an example, determining the one or more environmental characteristics at stage 1706 may include aggregating the radio frequency sensing reports (e.g., as described for FIGS. 7A, 7B, 8C, 9 and 13). The server 400, including the processor 410 and the transceiver 415, is a means for aggregating the radio frequency sensing reports. Aggregating the radio frequency sensing reports may include determining a composite result from the radio frequency sensing reports. In an example, the server 400 may be configured to query the data structure 1300 based on a location, a location area, UEIDs, a time, a time period and/or other fields to aggregate the radio frequency sensing reports and/or to determine the composite result. For example, referring to FIG. 14B, the server 400 may query the data structure 1300 based on a location area associated with the composite map 1454 to determine the locations of the UEs 1406, 1408, 1410 and the respective target objects 1412a-d. The server 400 may query the data structure 1300 based on a time period to determine the locations of the UEs 1406, 1408, 1410 and the respective target objects 1412a-d during the time period. The server 400 may utilize the associated fields in the objects table 1308 (e.g., range, bearing, attributes, etc.) and/or the signals table 1306 (e.g., boresight, time and/or frequency components) to determine the location of the target objects. The target objects may be plotted on a global coordinate system based on the locations of the UEs 1406, 1408, 1410 (e.g., latitude/longitude/altitude). The server 400 may also use the associated fields in the data structure 1300 to further classify the target objects. For example, machine learning methods may be used to classify target objects based on properties of the reflected RF signals.

In one embodiment, the one or more environmental characteristics determined at stage 1708 comprise a least one of: tracking a movement or a location or both of a person, a vehicle, an animal, a drone or an other object; determining one or more attributes of the person, the vehicle, the animal, the drone or the other object; and determining one or more attributes of a crowd of people, a plurality of vehicles, a group of animals, a group of drones or a set of other objects. The one or more attributes of the person, the vehicle, the animal, the drone or the other object may include a horizontal location, an altitude, a speed, a bearing, a size, a height, a width, a length, a weight, a type, a make, a model, a species, an orientation, a pose, a gait, a type of clothing, a carrying of a bag or package, or some combination of these. The one or more attributes of the crowd of people, the plurality of vehicles, the group of animals, the group of drones or the set of other objects may include a location, a location area, a density, a number, a rate of numeric increase, a rate of numeric decrease, an average speed, a statistical direction of motion, or some combination of these. The server may further include information in the radio frequency sensing assistance data provided at stage 1702 related to at least one of the movement, the location or the one or more attributes of the person, the vehicle, the animal, the drone or the other object. The server may also or instead include information in the radio frequency sensing assistance data provided at stage 1702 related to at least one of the one or more attributes of the crowd of people, the plurality of vehicles, the group of animals, the group of drones or the set of other objects.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C." or a list of "one or more of A, B. or C" or a list of A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item. e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the spirit or scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method at a wireless device for crowdsourcing radio frequency sensing data, comprising: receiving radio frequency sensing assistance data from a server; performing radio frequency sensing operations based at least in part on the radio frequency sensing assistance data, and reporting radio frequency sensing results to the server.

Clause 2. The method of clause 1 wherein the radio frequency sensing results are used for determining one or more environmental characteristics.

Clause 3. The method of clause 2 wherein the radio frequency sensing results are aggregated with a plurality of radio frequency sensing results received from a plurality of wireless devices, and the one or more environmental characteristics are determined based on an aggregation of the radio frequency sensing results.

Clause 4. The method of clause 2 wherein the one or more environmental characteristics comprise a movement of a target object, a location of the target object, one or more attributes of the target object, or any combination thereof.

Clause 5. The method of clause 4 wherein the one or more attributes of the target object include a horizontal location, an altitude, a speed, a bearing, a size, a height, a width, a length, a weight, a type, a make, a model, a species, an orientation, a pose, a gait, a type of clothing, a carrying of a bag or package, a location area, a density, a number, a rate of numeric increase, a rate of numeric decrease, an average speed, a statistical direction of motion, or any combinations thereof.

Clause 6. The method of clause 1 wherein the radio frequency sensing assistance data includes information related to at least one of a movement, a location of a target object.

Clause 7. The method of clause 1 wherein the radio frequency sensing assistance data includes information related to one or more attributes of a target object.

Clause 8. The method of clause 1 wherein the radio frequency sensing assistance data includes geographic information, and performing the radio frequency sensing operations is based at least in part on the geographic information.

Clause 9. The method of clause 1 wherein the radio frequency sensing assistance data includes transmitter configuration information, and performing the radio frequency sensing operations is based at least in part on the transmitter configuration information.

Clause 10. The method of clause 1 wherein the radio frequency sensing assistance data includes orthogonal frequency division multiplexing configuration information, and performing the radio frequency sensing operations is based at least in part on the orthogonal frequency division multiplexing configuration information.

Clause 11. The method of clause 1 wherein the radio frequency sensing assistance data includes RF signature or attribute information associated with one or more potential target objects, and performing the radio frequency sensing operations is based at least in part on the RF signature or attribute information.

Clause 12. The method of clause 1 wherein the radio frequency sensing assistance data includes timing information, and performing the radio frequency sensing operations is based at least in part on the timing information.

Clause 13. The method of clause 1 wherein performing the radio frequency sensing operations includes transmitting one or more radio frequency signals.

Clause 14. The method of clause 1 wherein performing the radio frequency sensing operations includes receiving one or more radio frequency signals transmitted by a proximate wireless node.

Clause 15. The method of clause 1 wherein performing the radio frequency sensing operations includes detecting one or more stationary target objects.

Clause 16. The method of clause 15 wherein the radio frequency sensing assistance data includes location information associated with the one or more stationary target objects.

Clause 17. The method of clause 1 further comprising determining one or more attributes associated with a target object based on the radio frequency sensing operations.

Clause 18. The method of clause 17 wherein one or more attributes associated with the target object include a range, a bearing, an elevation, a size, a velocity, a direction of motion, or any combinations thereof.

Clause 19. The method of clause 17 wherein reporting the radio frequency sensing results includes reporting the one or more attributes associated with the target object.

Clause 20. The method of clause 1 wherein reporting the radio frequency sensing results includes reporting radio frequency signal information based on the radio frequency sensing operations.

Clause 21. The method of clause 20 wherein the radio frequency signal information includes time based components, frequency based components, or both.

Clause 22. The method of clause 1 further comprising obtaining sensor data, and reporting the radio frequency sensing results includes reporting the sensor data.

Clause 23. The method of clause 22 wherein the sensor data includes an image from a visual light based camera or an infrared camera.

Clause 24. The method of clause 1 wherein the radio frequency sensing assistance data is received via one or more LTE Positioning Protocol (LPP) messages.

Clause 25. The method of clause 1 wherein the radio frequency sensing assistance data is received via one or more Radio Resource Control (RRC) messages or one or more IP messages or TCP/IP messages.

Clause 26. A method of environment detection at a server using radio frequency sensing, comprising: providing radio frequency sensing assistance data to one or more wireless devices; receiving one or more radio frequency sensing reports from the one or more wireless devices; and determining one or more environmental characteristics based at least in part on the one or more radio frequency sensing reports.

Clause 27. The method of clause 26 wherein determining the one or more environmental characteristics includes aggregating the one or more radio frequency sensing reports.

Clause 28. The method of clause 27 wherein the one or more environmental characteristics comprise a movement or a location or both of a person, a vehicle, an animal, a drone or an other target object, one or more attributes of the person, the vehicle, the animal, the drone or the other target object, one or more attributes of a crowd of people, a plurality of vehicles, a group of animals, a group of drones or a set of other target objects.

Clause 29. The method of clause 28 wherein the one or more attributes of the person, the vehicle, the animal, the drone or the other target object include a horizontal location, an altitude, a speed, a bearing, a size, a height, a width, a length, a weight, a type, a make, a model, a species, an orientation, a pose, a gait, a type of clothing, a carrying of a bag or package, or any combination thereof.

Clause 30. The method of clause 28 wherein the one or more attributes of the crowd of people, the plurality of vehicles, the group of animals, the group of drones or the set of other target objects include, a location area, a density, a number, a rate of numeric increase, a rate of numeric decrease, an average speed, a statistical direction of motion, or any combination thereof.

Clause 31. The method of clause 28 wherein the radio frequency sensing assistance data comprises information related to at least one of the movement, the location or the one or more attributes of the person, the vehicle, the animal, the drone or the other target object.

Clause 32. The method of clause 28 further comprising including information in the radio frequency sensing assistance data related to at least one of the one or more attributes of the crowd of people, the plurality of vehicles, the group of animals, the group of drones or the set of other target objects.

Clause 33. The method of clause 26 wherein the radio frequency sensing assistance data includes geographic information.

Clause 34. The method of clause 26 wherein the radio frequency sensing assistance data includes transmitter configuration information.

Clause 35. The method of clause 26 wherein the radio frequency sensing assistance data includes orthogonal frequency division multiplexing configuration information.

Clause 36. The method of clause 26 wherein the radio frequency sensing assistance data includes RF signature information, attribute information or both associated with a potential target object.

Clause 37. The method of clause 26 wherein the radio frequency sensing assistance data includes timing information for performing radio frequency sensing operations.

Clause 38. The method of clause 26 further comprising storing information contained in the one or more radio frequency sensing reports in a data structure.

Clause 39. The method of clause 38 wherein aggregating the one or more radio frequency sensing reports includes querying the data structure based on a location area.

Clause 40. The method of clause 38 wherein aggregating the one or more radio frequency sensing reports includes querying the data structure based on a time period.

Clause 41. The method of clause 26 wherein the one or more radio frequency sensing reports includes one or more attributes associated with a target object.

Clause 42. The method of clause 41 wherein the one or more attributes associated with the target object include a range, a bearing, an elevation, a size, a velocity, a direction of motion, or any combinations thereof.

Clause 43. The method of clause 26 wherein the one or more radio frequency sensing reports include radio frequency signal information based on radio frequency sensing operations performed by the one or more wireless devices.

Clause 44. The method of clause 43 wherein the radio frequency signal information includes time based components, frequency based components, or both.

Clause 45. The method of clause 26 wherein the one or more radio frequency sensing reports include sensor data obtained by the one or more wireless devices.

Clause 46. The method of clause 45 wherein the sensor data includes an image from a visual light based camera or an infrared camera.

Clause 47. The method of clause 26 wherein the radio frequency sensing assistance data is provided via one or more LTE Positioning Protocol (LPP) messages.

Clause 48. The method of clause 26 wherein the radio frequency sensing assistance data is provided via one or more Radio Resource Control (RRC) messages or one or more IP or TCP/IP messages.

Clause 49. The method of clause 26 wherein determining the one or more environmental characteristics includes determining a density of target objects.

Clause 50. The method of clause 26 wherein determining the one or more environmental characteristics includes determining a motion direction for target objects.

Clause 51. The method of clause 26 wherein determining the one or more environmental characteristics includes determining one or more attributes for target objects.

Clause 52. An apparatus, comprising: a memory; at least one transceiver; at least one processor communicatively coupled to the memory and the at least one transceiver, and configured to: receive radio frequency sensing assistance data from a server; perform radio frequency sensing operations based at least in part on the radio frequency sensing assistance data; and report radio frequency sensing results to the server.

Clause 53. The apparatus of clause 52 wherein the radio frequency sensing results are used for determining one or more environmental characteristics.

Clause 54. The apparatus of clause 53 wherein the radio frequency sensing results are aggregated with a plurality of radio frequency sensing results received from a plurality of wireless devices, and the one or more environmental characteristics are determined based on an aggregation of the radio frequency sensing results.

Clause 55. The apparatus of clause 53 wherein the one or more environmental characteristics comprise a movement of a target object, a location of a target object, one or more attributes of the target object, or any combinations thereof.

Clause 56. The apparatus of clause 55 wherein the one or more attributes of the target object include a horizontal location, an altitude, a speed, a bearing, a size, a height, a width, a length, a weight, a type, a make, a model, a species, an orientation, a pose, a gait, a type of clothing, a carrying of a bag or package, a location area, a density, a number, a rate of numeric increase, a rate of numeric decrease, an average speed, a statistical direction of motion, or any combinations thereof.

Clause 57. The apparatus of clause 52 wherein the radio frequency sensing assistance data includes information related to at least one of a movement, a location of a target object, or any combinations thereof.

Clause 58. The apparatus of clause 52 wherein the radio frequency sensing assistance data includes information related to one or more attributes of a target object.

Clause 59. The apparatus of clause 52 wherein the radio frequency sensing assistance data includes geographic information, and the at least one processor is further configured to perform the radio frequency sensing operations based at least in part on the geographic information.

Clause 60. The apparatus of clause 52 wherein the radio frequency sensing assistance data includes transmitter configuration information, and the at least one processor is further configured to perform the radio frequency sensing operations based at least in part on the transmitter configuration information.

Clause 61. The apparatus of clause 52 wherein the radio frequency sensing assistance data includes orthogonal frequency division multiplexing configuration information, and the at least one processor is further configured to perform the radio frequency sensing operations based at least in part on the orthogonal frequency division multiplexing configuration information.

Clause 62. The apparatus of clause 52 wherein the radio frequency sensing assistance data includes RF signature or attribute information associated with one or more potential target objects, and the at least one processor is further configured to performing the radio frequency sensing operations is based at least in part on the RF signature or attribute information.

Clause 63. The apparatus of clause 52 wherein the radio frequency sensing assistance data includes timing information, and the at least one processor is further configured to perform the radio frequency sensing operations is based at least in part on the timing information.

Clause 64. The apparatus of clause 52 wherein the at least one processor is further configured to transmit one or more radio frequency signals to perform the radio frequency sensing operations.

Clause 65. The apparatus of clause 52 wherein the at least one processor is further configured to receive one or more radio frequency signals transmitted by a proximate wireless node to perform the radio frequency sensing operations.

Clause 66. The apparatus of clause 52 wherein the at least one processor is further configured to detect one or more stationary objects based at least in part on the radio frequency sensing operations.

Clause 67. The apparatus of clause 66 wherein the radio frequency sensing assistance data includes location information associated with the one or more stationary objects.

Clause 68. The apparatus of clause 52 wherein the at least one processor is further configured to determine one or more attributes associated with a target object based on the radio frequency sensing operations.

Clause 69. The apparatus of clause 68 wherein the one or more attributes associated with the target object include a range, a bearing, an elevation, a size, a velocity, a direction of motion, or and combinations thereof.

Clause 70. The apparatus of clause 68 wherein the at least one processor is further configured to report the one or more attributes associated with the target object.

Clause 71. The apparatus of clause 52 wherein the at least one processor is further configured to report radio frequency signal information based on the radio frequency sensing operations.

Clause 72. The apparatus of clause 71 wherein the radio frequency signal information includes time based components, frequency based components, or both.

Clause 73. The apparatus of clause 72 wherein the at least one processor is further configured to obtain sensor data and report the sensor data.

Clause 74. The apparatus of clause 73 wherein the sensor data includes an image from a visual light based camera or an infrared camera.

Clause 75. The apparatus of clause 52 wherein the radio frequency sensing assistance data is received via one or more LTE Positioning Protocol (LPP) messages.

Clause 76. The apparatus of clause 52 wherein the radio frequency sensing assistance data is received via one or more Radio Resource Control (RRC) messages or one or more IP messages or TCP/IP messages.

Clause 77. An apparatus, comprising: a memory; at least one transceiver; at least one processor communicatively coupled to the memory and the at least one transceiver, and configured to: provide radio frequency sensing assistance data to one or more wireless devices; receive one or more radio frequency sensing reports from the one or more wireless devices; and determine one or more environmental characteristics based at least in part on the one or more radio frequency sensing reports.

Clause 78. The apparatus of clause 77 wherein the at least one processor is further configured to aggregate the one or more radio frequency sensing reports to determine the one or more environmental characteristics.

Clause 79. The apparatus of clause 77, wherein to determine the one or more environmental characteristics, the at least one processor is further configured to perform one or more of: track a movement or a location or both of a person, a vehicle, an animal, a drone or an other target object; determine one or more attributes of the person, the vehicle, the animal, the drone or the other target object; and determine one or more attributes of a crowd of people, a plurality of vehicles, a group of animals, a group of drones or a set of other target objects.

Clause 80. The apparatus of clause 79 wherein the one or more attributes of the person, the vehicle, the animal, the drone or the other target object include a horizontal location, an altitude, a speed, a bearing, a size, a height, a width, a length, a weight, a type, a make, a model, a species, an orientation, a pose, a gait, a type of clothing, a carrying of a bag or package, or any combination thereof.

Clause 81. The apparatus of clause 79 wherein the one or more attributes of the crowd of people, the plurality of vehicles, the group of animals, the group of drones or the set of other target objects include, a location area, a density, a number, a rate of numeric increase, a rate of numeric decrease, an average speed, a statistical direction of motion, or any combination thereof.

Clause 82. The apparatus of clause 79 wherein the at least one processor is further configured to provide information in the radio frequency sensing assistance data related to at least one of the movement, the location or the one or more attributes of the person, the vehicle, the animal, the drone or the other target object.

Clause 83. The apparatus of clause 79 wherein the at least one processor is further configured to provide information in the radio frequency sensing assistance data related to at least one of the one or more attributes of the crowd of people, the plurality of vehicles, the group of animals, the group of drones or the set of other target objects.

Clause 84. The apparatus of clause 77 wherein the radio frequency sensing assistance data includes geographic information.

Clause 85. The apparatus of clause 77 wherein the radio frequency sensing assistance data includes transmitter configuration information.

Clause 86. The apparatus of clause 77 wherein the radio frequency sensing assistance data includes orthogonal frequency division multiplexing configuration information.

Clause 87. The apparatus of clause 77 wherein the radio frequency sensing assistance data includes RF signature information, attribute information or both associated with a potential target object.

Clause 88. The apparatus of clause 77 wherein the radio frequency sensing assistance data includes timing information for performing radio frequency sensing operations.

Clause 89. The apparatus of clause 77 further comprising storing information contained in the one or more radio frequency sensing reports in a data structure.

Clause 90. The apparatus of clause 89 wherein the at least one processor is further configured to query the data structure based on a location area.

Clause 91. The apparatus of clause 89 wherein the at least one processor is further configured to query the data structure based on a time period.

Clause 92. The apparatus of clause 77 wherein the one or more radio frequency sensing reports includes one or more attributes associated with a target object.

Clause 93. The apparatus of clause 92 wherein the one or more attributes associated with the target object include a range, a bearing, an elevation, a size, a velocity, a direction of motion, or combinations thereof.

Clause 94. The apparatus of clause 77 wherein the one or more radio frequency sensing reports include radio frequency signal information based on radio frequency sensing operations performed by the one or more wireless devices.

Clause 95. The apparatus of clause 94 wherein the radio frequency signal information includes time based components, frequency based components, or both.

Clause 96. The apparatus of clause 77 wherein the one or more radio frequency sensing reports include sensor data obtained by the one or more wireless devices.

Clause 97. The apparatus of clause 96 wherein the sensor data includes an image from a visual light based camera or an infrared camera.

Clause 98. The apparatus of clause 77 wherein the radio frequency sensing assistance data is provided via one or more LTE Positioning Protocol (LPP) messages.

Clause 99. The apparatus of clause 77 wherein the radio frequency sensing assistance data is provided via one or more Radio Resource Control (RRC) messages or one or more IP or TCP/IP messages.

Clause 100. The apparatus of clause 77 wherein the at least one processor is further configured to determine a density of target objects.

Clause 101. The apparatus of clause 77 wherein the at least one processor is further configured to determine a motion direction for target objects.

Clause 102. The apparatus of clause 77 wherein the at least one processor is further configured to determine one or more attributes for target objects.

Clause 103. The apparatus of clause 77 wherein the at least one processor is further configured to provide an indication to the one or more wireless devices to perform radio frequency sensing operations.

Clause 104. An apparatus for crowdsourcing radio frequency sensing, comprising: means for receiving radio frequency sensing assistance data from a server; means for performing radio frequency sensing operations based at least in part on the radio frequency sensing assistance data; and means for reporting radio frequency sensing results to the server.

Clause 105. An apparatus for environment detection at a server using radio frequency sensing, comprising: means for providing radio frequency sensing assistance data to one or more wireless devices; means for receiving one or more radio frequency sensing reports from the one or more wireless devices; and means for determining one or more environmental characteristics based at least in part on the one or more radio frequency sensing reports.

Clause 106. A non-transitory processor-readable storage medium comprising processor-readable instructions configured to cause one or more processors to crowdsource radio frequency sensing, comprising code for: receiving radio frequency sensing assistance data from a server; performing radio frequency sensing operations based at least in part on the radio frequency sensing assistance data; and reporting radio frequency sensing results to the server.

Clause 107. A non-transitory processor-readable storage medium comprising processor-readable instructions configured to cause one or more processors to detect environmental characteristics using radio frequency sensing, comprising code for: providing radio frequency sensing assistance data to one or more wireless devices; receiving one or more radio frequency sensing reports from the one or more wireless devices; and determining one or more environmental characteristics based at least in part on the one or more radio frequency sensing reports.

The invention claimed is:

1. A method at a wireless device for crowdsourcing radio frequency sensing data, comprising:
   receiving radio frequency sensing assistance data from a server;
   performing radio frequency sensing operations based at least in part on the radio frequency sensing assistance data;
   determining at least one environmental characteristic of a plurality of objects based on the radio frequency sensing operations, the at least one environmental characteristic of the plurality of objects including a rate of change of a quantity of the plurality of objects; and
   reporting radio frequency sensing results to the server, the radio frequency sensing results including the at least one environmental characteristic of the plurality of objects.

2. The method of claim 1 wherein the radio frequency sensing results are aggregated with a plurality of radio frequency sensing results received from a plurality of wireless devices, and the at least one environmental characteristic is determined based on an aggregation of the radio frequency sensing results.

3. The method of claim 1 wherein the radio frequency sensing assistance data includes information related to at least one of a movement, a location of a target object, or any combinations thereof.

4. The method of claim 1 wherein the radio frequency sensing assistance data includes information related to one or more attributes of a target object.

5. The method of claim 1 wherein the radio frequency sensing assistance data includes geographic information.

6. The method of claim 1 wherein the radio frequency sensing assistance data includes RF signature or attribute information associated with one or more potential target objects.

7. The method of claim 1 wherein the radio frequency sensing assistance data is received via one or more Radio Resource Control (RRC) messages or one or more IP messages or TCP/IP messages.

8. A method of environment detection at a server using radio frequency sensing, comprising:
   providing radio frequency sensing assistance data to one or more wireless devices;
   receiving one or more radio frequency sensing reports from the one or more wireless devices, the one or more radio frequency sensing reports including radio frequency signal measurement information of a plurality of objects; and
   determining one or more environmental characteristics of the plurality of objects, the one or more environmental characteristics of the plurality of objects including a rate of change of a quantity of the plurality of objects.

9. The method of claim 8 wherein the radio frequency sensing assistance data includes information related to at least one of a movement, a location, one or more attributes of a target object, or any combinations thereof.

10. The method of claim 8 wherein the radio frequency sensing assistance data includes geographic information.

11. The method of claim 8 wherein the radio frequency sensing assistance data includes RF signature information, attribute information or both associated with a potential target object.

12. The method of claim 8 wherein the one or more radio frequency sensing reports include sensor data obtained by the one or more wireless devices.

13. The method of claim 8 wherein the radio frequency sensing assistance data is provided via one or more Radio Resource Control (RRC) messages or one or more IP or TCP/IP messages.

14. The method of claim 8 wherein the one or more environmental characteristics includes a density of the plurality of objects.

15. An apparatus, comprising:

a memory;

at least one transceiver;

at least one processor communicatively coupled to the memory and the at least one transceiver, and configured to:

receive radio frequency sensing assistance data from a server;

perform radio frequency sensing operations based at least in part on the radio frequency sensing assistance data;

determine at least one environmental characteristic of a plurality of objects based on the radio frequency sensing operations, the at least one environmental characteristic of the plurality of objects including a rate of change of a quantity of the plurality of objects; and report radio frequency sensing results to the server, the radio frequency sensing results including the at least one environmental characteristic of the plurality of objects.

16. The apparatus of claim 15 wherein the radio frequency sensing results are aggregated with a plurality of radio frequency sensing results received from a plurality of wireless devices, and the at least one environmental characteristic is determined based on an aggregation of the radio frequency sensing results.

17. The apparatus of claim 15 wherein the radio frequency sensing assistance data includes information related to at least one of a movement, a location a target object, or any combinations thereof.

18. The apparatus of claim 15 wherein the radio frequency sensing assistance data includes information related to one or more attributes of a target object.

19. The apparatus of claim 15 wherein the radio frequency sensing assistance data includes geographic information.

20. The apparatus of claim 15 wherein the radio frequency sensing assistance data includes transmitter configuration information.

21. The apparatus of claim 15 wherein the radio frequency sensing assistance data includes RF signature or attribute information associated with one or more potential target objects.

22. The apparatus of claim 15 wherein the radio frequency sensing assistance data is received via one or more Radio Resource Control (RRC) messages or one or more IP messages or TCP/IP messages.

23. An apparatus, comprising:

a memory;

at least one transceiver;

at least one processor communicatively coupled to the memory and the at least one transceiver, and configured to:

provide radio frequency sensing assistance data to one or more wireless devices;

receive one or more radio frequency sensing reports from the one or more wireless devices, the one or more radio frequency sensing reports including radio frequency signal measurement information of a plurality of objects; and determine one or more environmental characteristics of a plurality of objects based on the radio frequency signal measurement information, the one or more environmental characteristics of the plurality of objects including a rate of change of a quantity of the plurality of objects.

24. The apparatus of claim 23 wherein the at least one processor is further configured to aggregate the one or more radio frequency sensing reports to determine the one or more environmental characteristics.

25. The apparatus of claim 23 wherein the radio frequency sensing assistance data includes geographic information.

26. The apparatus of claim 23 wherein the radio frequency sensing assistance data includes RF signature information, attribute information or both associated with a potential target object.

27. The apparatus of claim 23 wherein the radio frequency sensing assistance data includes timing information for performing radio frequency sensing operations.

28. The apparatus of claim 23 wherein the one or more radio frequency sensing reports include radio frequency signal information based on radio frequency sensing operations performed by the one or more wireless devices.

29. The apparatus of claim 28 wherein the radio frequency signal information includes time based components, frequency based components, or both.

30. The apparatus of claim 23 wherein the radio frequency sensing assistance data is provided via one or more Radio Resource Control (RRC) messages or one or more IP or TCP/IP messages.

* * * * *